United States Patent
Yodo et al.

(10) Patent No.: US 6,993,567 B1
(45) Date of Patent: Jan. 31, 2006

(54) RECORDING/REPRODUCING APPARATUS, DATA REPRODUCING METHOD, AND DATA RECORDING/REPRODUCING METHOD

(75) Inventors: Fumitake Yodo, Tokyo (JP); Junichi Aramaki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/462,789

(22) PCT Filed: May 19, 1999

(86) PCT No.: PCT/JP99/02602

§ 371 (c)(1),
(2), (4) Date: Jan. 12, 2000

(87) PCT Pub. No.: WO99/60569

PCT Pub. Date: Nov. 25, 1999

(30) Foreign Application Priority Data

May 19, 1998 (JP) .......................... 10-136472

(51) Int. Cl.
G06F 15/16 (2006.01)
G11B 5/09 (2006.01)
H04N 5/91 (2006.01)

(52) U.S. Cl. .................... 709/217; 386/94; 360/53; 709/219

(58) Field of Classification Search ............ 386/64, 386/94, 95, 52, 103; 360/32, 69, 53, 48, 18; 709/217, 219, 202, 224; 380/228, 278; 341/50; 84/601; 704/500; 725/104; 711/205, 207, 711/221, 155; 707/3; 369/97.23
See application file for complete search history.

(56) References Cited

U.S. PATENT DOCUMENTS

| | | | | |
|---|---|---|---|---|
| 5,289,190 A | * | 2/1994 | Shimoda et al. ............... 341/50 |
| 5,400,186 A | * | 3/1995 | Inoue et al. ................... 360/32 |
| 5,432,646 A | * | 7/1995 | Nakamura et al. ............ 360/18 |
| 5,440,529 A | * | 8/1995 | Takezawa et al. ........ 369/47.23 |
| 5,574,570 A | * | 11/1996 | Ohkuma et al. ............ 386/103 |
| 5,619,247 A | * | 4/1997 | Russo ......................... 725/104 |
| 5,654,516 A | * | 8/1997 | Tashiro et al. ................ 84/601 |
| 5,870,710 A | * | 2/1999 | Ozawa et al. ............... 704/500 |
| 5,907,444 A | * | 5/1999 | Oguro .......................... 360/69 |
| 5,959,948 A | * | 9/1999 | Oshima ...................... 380/228 |
| 5,982,977 A | * | 11/1999 | Naruse et al. ................ 386/64 |
| 5,999,354 A | * | 12/1999 | Shitara ......................... 360/53 |
| 6,067,541 A | * | 5/2000 | Raju et al. ..................... 707/3 |
| 6,085,019 A | * | 7/2000 | Ito et al. ....................... 386/52 |
| 6,115,533 A | * | 9/2000 | Tahara et al. ................. 386/94 |
| 6,188,834 B1 | * | 2/2001 | Edakubo et al. ............. 386/95 |
| 6,266,482 B1 | * | 7/2001 | Yagasaki et al. ............. 386/94 |
| 6,324,334 B1 | * | 11/2001 | Morioka et al. ............. 386/52 |
| 6,490,408 B1 | * | 12/2002 | Um et al. ..................... 386/94 |
| 6,516,337 B1 | * | 2/2003 | Tripp et al. ................. 709/202 |

* cited by examiner

*Primary Examiner*—Jan L Wen
*Assistant Examiner*—Kenny Lin
(74) *Attorney, Agent, or Firm*—Jay H. Maioli

(57) ABSTRACT

Although music program data has been recorded on a disc, imperfect index data or a signal has been recorded so that music program data is prohibited from being reproduced. To allow music program data to be reproduced, the index data is rewritten to perfect index data or a permission signal that allows music program data to be reproduced is transmitted through a communication line. Thus, music program data can be reproduced from the disc. Since music program data is not directly transmitted, the data transmission time is shortened. The music program data can be downloaded at high speed. In addition, the charging process can be smoothly performed. Moreover, music program data can be prevented from being illegally used.

13 Claims, 14 Drawing Sheets

Fig. 9A
Fig. 9B
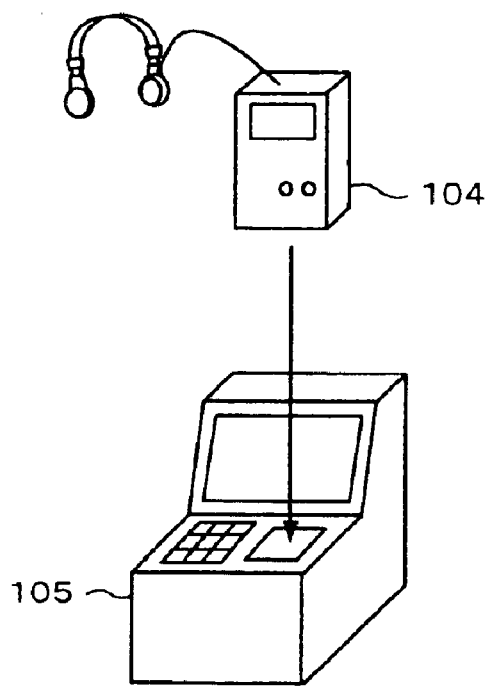
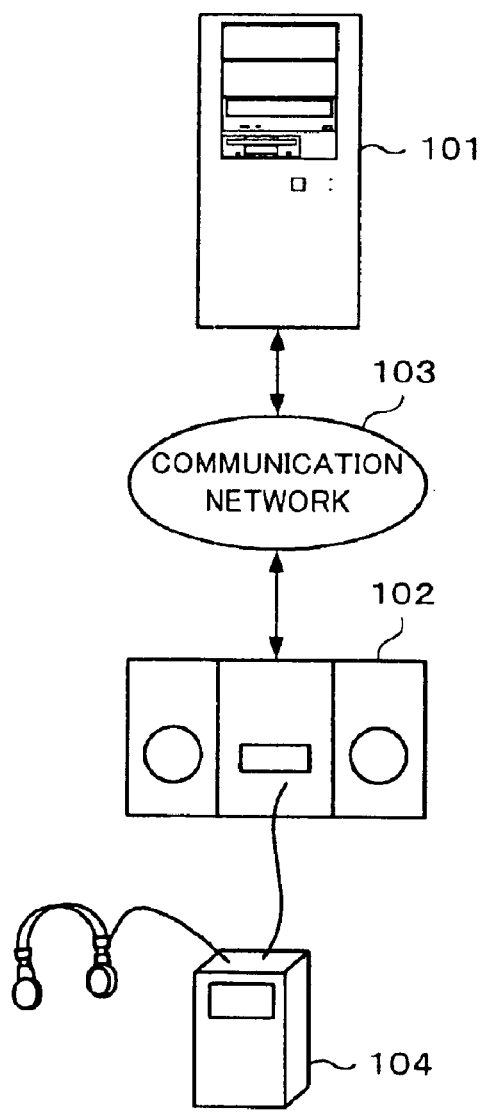

RECORDING/REPRODUCING APPARATUS, DATA REPRODUCING METHOD, AND DATA RECORDING/REPRODUCING METHOD

This application claims the priority of PCT/JP99/02602 filed on May 19, 1999.

TECHNICAL FIELD

The present invention relates to a recording and reproducing apparatus, a data reproducing method, and a data recording and reproducing method. In particular, the present invention relates to a data recording and reproducing apparatus, a data reproducing method, and a data recording and reproducing method for reproducing data corresponding to a signal for causing data to be reproduced.

RELATED ART

In recent years, various services using computer networks are being accomplished. As an example of such services, a music program distributing system is known. In the music program distributing system, a music program distributing server is disposed on a network. In the music program distributing system, the user can download a desired music program from the music program distributing server.

In such a music program distributing system, the music distributing server is disposed on a computer network such as the Internet. The music program distributing server stores data of many music programs. In addition to the data of music programs, the music program distributing server may store various information in association with the music program data. Examples of information in association with data of music programs are artist names, song texts, latest hit music program information, and new music program information. When the user uses the music program distributing system, a terminal unit of the user is connected to the music program distributing server through a computer network. When the terminal unit of the user is connected to the music program distributing server, the music program distributing server transmits data of music programs data and various information in association therewith to the terminal unit of the user. The user can obtain latest hit music program information and new music program information from data of music programs and information in association therewith received from the music program distributing server.

The music program distributing server transmits list information of downloadable music programs to the terminal unit of the user. The list information is displayed on a displaying portion of the terminal unit of the user. When the user finds a desired music program on the list information, he or she selects the desired music program on the list information and transmits a download command to the music-program distributing server.

When the music program distributing server receives the download command from the terminal unit of the user, the music program distributing server transmits the data of the music program corresponding to the download command to the terminal unit of the user. Thus, the terminal unit of the user receives the data of the music program corresponding to the download command from the music program distributing server. The received data of the music program is stored to a storage device such as a recordable optical disc.

However, the amount of data stored on one compact disc (CD) is up to 640 MB. When data of music programs stored on one compact disc is transmitted using an ISDN line at 128 kbps, it will take more than 10 hours to completely transmit the data. Even if the amount of data recorded on a compact disc is decreased to around ¼.₅ of original size with a compressing method used for a 64-mm diameter recordable optical disc (for example, modified DCT (Discrete Cosine Transform) method disclosed in for example Japanese Patent Laid-Open Publication Nos. 3-139923 and 3-139922), it will take more than 2 hours to completely transmit the data. Thus, in such a music program distributing service, the data transmission time will become a bottleneck.

Moreover, from a viewpoint of copyright protection of data of music programs, in the above-described music program distributing system, whenever data of a music program is downloaded from the music program distributing server, the user should be charged for the data of the music program. However, to charge the user for the data of the music program, the music program distributing server should perform various processes for registering the user, such as identifying the user, identifying the data of the music program that was downloaded to the user, charging the user for the downloaded data of the music program, and determining whether the charging process was completed. Starting at the beginning of the charging process, the total download time during which the music program distributing server receives a download command, distributes data of a music program corresponding to the download command to the terminal unit of the user, and the terminal unit of the user downloads the music program data becomes long.

Therefore, an object of the present invention is to provide a recording and reproducing apparatus, a data reproducing method, and a data recording and reproducing method that allow the data transmission time to shorten.

Another object of the present invention is to provide a recording and reproducing apparatus, a data reproducing method, and a data recording and reproducing method that allow a charging process to be smoothly performed.

DISCLOSURE OF THE INVENTION

The present invention is a recording and reproducing apparatus, comprising a storing portion for storing at least one program of content data, a recording and reproducing portion for writing content data to the storing portion and reading content data from the storing portion, a signal generating portion for generating a permission signal that allows the recording and reproducing portion to reproduce content data stored in the storing portion, wherein when the signal generating portion transmits the permission signal to the recording and reproducing portion, the recording and reproducing portion reproduces content data stored in the storing portion.

The present invention is a recording and reproducing apparatus, comprising a recording and reproducing portion, having a storing portion for storing at least one program of content data, for writing content data to the storing portion and reading content data from the storing portion, and a server unit having a signal generating portion for generating a permission signal that allows the recording and reproducing portion to reproduce content data stored in the storing portion, wherein when the signal generating portion transmits the permission signal to the recording and reproducing portion, the recording and reproducing portion reproduces content data stored in the storing portion.

The present invention is a data reproducing method, comprising the steps of issuing a content data transmission request to a server unit, the content data transmission request causing a server unit to transmit index data corresponding to contents data reproduced from a storing portion of a terminal unit, the storing portion storing at least one program of content data and the index data, causing the server unit to transmit index data of content data reproduced by the terminal unit corresponding to the transmission request received from the terminal unit, causing the terminal unit to rewrite the index data stored in the storing portion corresponding to the index data received from the server unit, and causing the terminal unit to reproduce content data stored in the storing portion corresponding to the rewritten index data.

The present invention is a data reproducing method, comprising the steps of reading charging data stored in a storing portion when a terminal unit having the storing portion for storing at least one program of content data and charging data corresponding thereto is connected to a charging processing unit, transmitting the charging data that is read from the storing portion to the charging processing unit and to a server unit connected thereto through a communication network so as to perform a charging process, and allowing the terminal unit to reproduce contents data stored in the storing portion after the charging process has been completed between the charging processing unit and the server unit.

The present invention is a data recording and reproducing method, comprising the steps of storing at least one program of content data stored in a first storing portion and charging data that represents charging information of the content data to a second storing portion of a terminal unit, reading the charging data stored in the storing portion when the terminal unit is connected to a charging processing unit, transmitting the charging data to the charging processing unit and to a server unit connected thereto through a communication network, and allowing the terminal unit to reproduce contents data stored in the storing portion after the charging process has been completed between the charging processing unit and the server unit.

According to the present invention, although music program data is perfectly recorded on a disc, TOC (Table of Contents) data corresponding thereto is not perfectly recorded thereon. When the TOC data is imperfect, music program data cannot be reproduced from a disc. When music program data is reproduced from the disc, TOC data is rewritten to perfect TOC data.

When music program data is purchased through a communication line, although the music program data has been recorded on a disc, a signal that prohibits the music program data from being reproduced is recorded on the disc. Unless the music program data is charged, the music program data on the disc cannot be reproduced. To allow the music program data on the disc to be reproduced, it is necessary to perform a charging process through a communication line. After the charging process has been performed, the signal is canceled so that the music program data can be reproduced.

In such a manner, although music program data has been recorded on a disc, imperfect TOC data or a signal has been recorded so that music program data is prohibited from being reproduced. To allow music program data to be reproduced, the TOC data is rewritten or the signal is canceled.

Thus, since the data transmission time is shortened, music program data can be downloaded at high speed. In addition, the charging process can be smoothly performed. Moreover, music program data can be prevented from being illegally used.

BRIEF DESCRIPTION OF DRAWINGS

FIGS. 9A and 9B are block diagrams showing other examples of systems according to the present invention;

BEST MODES FOR CARRYING OUT THE INVENTION

Next, with reference to the accompanying drawings, an embodiment of the present invention will be described. As an example, a system using an optical disc as a recording medium will be described.

1. Example of System

In the system, data of a music program is recorded or reproduced to/from a 64-mm diameter optical disc or magneto-optical disc that is contained in a disc cartridge. There are three types of 64-mm diameter optical discs. The first type is a reproduction-only type disc shown in FIG. 1A. The second type is a record and reproduction type disc shown in FIG. 1B. The third type is a hybrid type disc having a reproduction-only record area and a recordable and reproducible record area as shown in FIG. 1C.

Figure 1A:
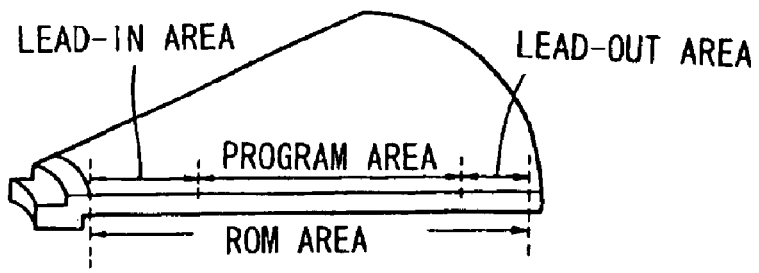
FIGS. 1A, 1B, and 1C are sectional views for explaining discs.

As shown in FIG. 1A, all the record area of the reproduction-only type disc is a reproduction-only area in which information is recorded as pits. Referring to FIG. 1A, a TOC (Table Of Contents) area is disposed in a lead-in area on an inner periphery of the disc. In the TOC area, TOC (Table Of Contents) data for managing data recorded in a program area (that will be described later) is recorded. The program area is disposed on an outer periphery of the TOC area. A lead-out area is disposed on an outer periphery of the program area.

Figure 1B:
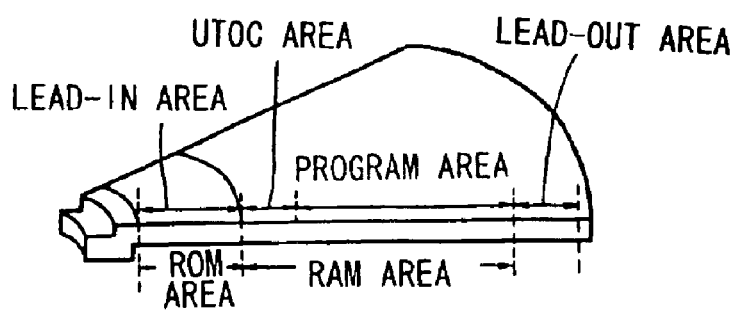

As shown in FIG. 1B, a lead-in area is disposed on an inner periphery of the record and reproduction type disc. The lead-in area is a reproduction-only area in which information is recorded as pits. Read-only TOC (P-TOC) data is recorded in the reproduction-only area. A record and reproduction area for recording and reproducing information is disposed on an outer periphery of the P-TOC area. A U-TOC area is disposed between an inner periphery of the record and reproduction area and an outer periphery of the P-TOC area. In the U-TOC area, TOC data for managing data recorded in the record and reproduction area is recorded (hereinafter, the TOC data is referred to as U-TOC data). A program area for recording and reproducing data is disposed on an outer periphery of the U-TOC area. A lead-out area is disposed on an outer periphery of the program area. A magneto-optical recording layer is formed on the record and reproduction type disc so that the magneto-optical recording layer covers at least the record and reproduction area.

Figure 1C:
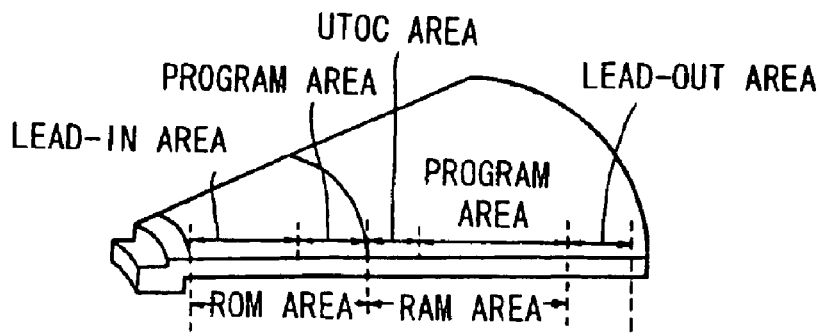

As shown in FIG. 1C, a reproduction-only area is disposed on an inner periphery of the hybrid type disc. In the reproduction-only area, information is recorded as pits. In addition, a reproduction-only program area is disposed for program data. A record and reproduction area is disposed on an outer periphery of the reproduction-only area. In the record and reproduction area, information can be recorded and reproduced. A U-TOC area is disposed on an inner periphery of the record and reproduction area. In the U-TOC area, U-TOC data for managing data recorded in a program area (that will be described later) of the record and reproduction area is recorded. A program area for recording and reproducing data is disposed on an outer periphery of the U-TOC area. A magneto-optical recording layer is formed on the hybrid type disc so that the magneto-optical recording layer covers at least the record and reproduction area.

Figure 2:
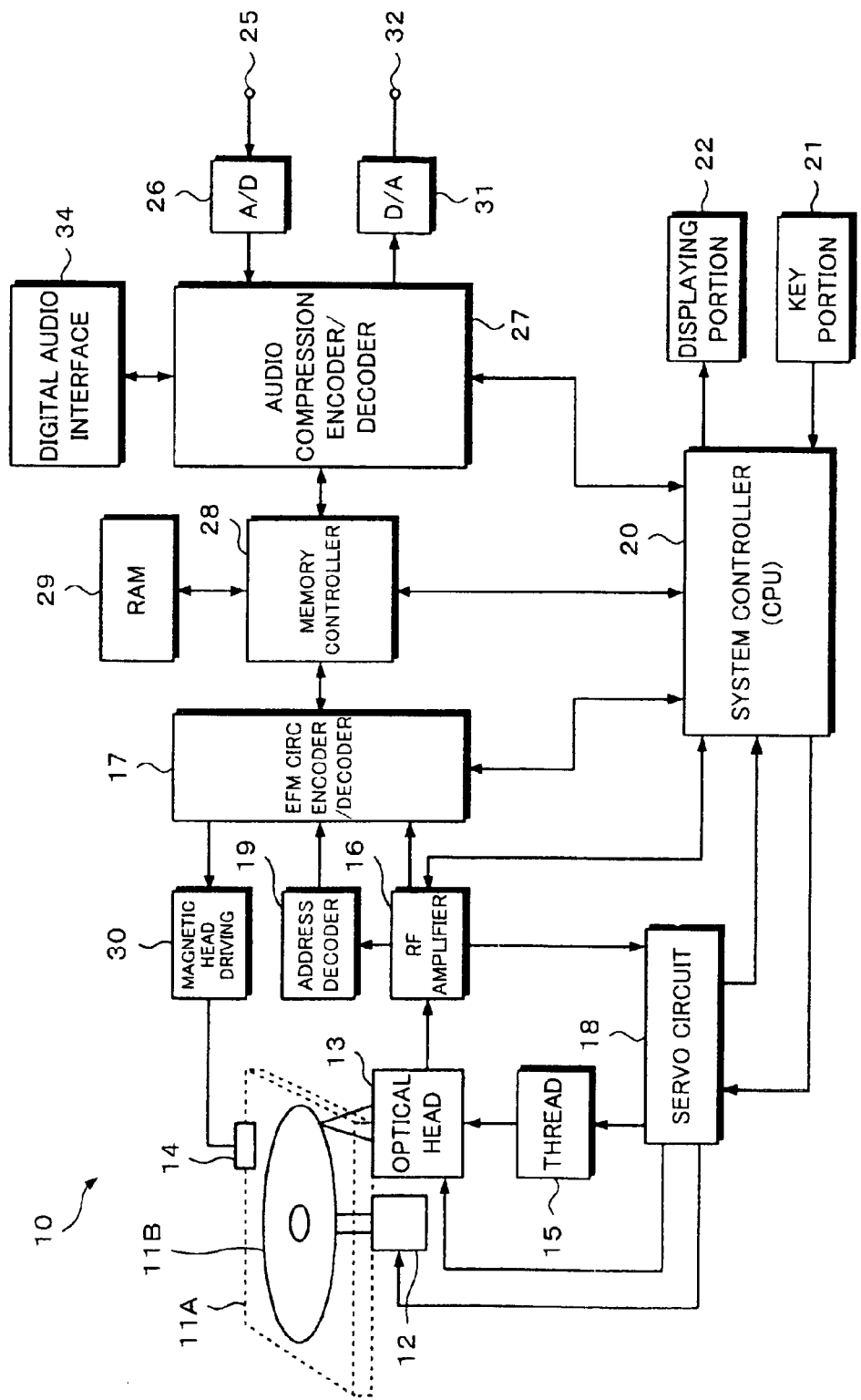
FIG. 2 is a block diagram showing an example of the structure of a recording and reproducing apparatus.

FIG. 2 is a block diagram showing the structure of a recording and reproducing apparatus 10 that records and reproduces data to/from one of the above-described three types of optical discs.

Referring to FIG. 2, an optical disc 11B is contained in a disc cartridge 11A. The optical disc 11B is one of the above-described three types of discs (namely, a reproduction-only type optical disc (see FIG. 1A), a record and reproduction type magneto-optical disc (see FIG. 1B), and a hybrid type disc having both a reproduction-only area and a record area (see FIG. 1C)). As described above, a P-TOC record area is disposed in a lead-in area on an inner periphery of the optical disc 11B. A data management area is disposed in an inner periphery of a record and reproduction area. In the data management area, U-TOC data is recorded. The optical disc 11B is rotated and driven by a spindle motor 12 of the recording and reproducing apparatus 10 under the control of a servo circuit 18.

In the apparatus 10, an optical head 13 is disposed opposite to the optical disc 11B. The optical head 13 can be moved in the radial direction of the optical disc 11B. In the record mode, the optical head 13 outputs high level laser light for heating the magneto-optical record layer in the record and reproduction area of the optical disc 11B to Curie temperature. In the reproduction mode, the optical head 13 outputs relatively low level laser light for detecting data from reflected light of the magneto-optical record layer corresponding to magnetic Kerr effect.

The optical head 13 has a laser diode, an optical system, and a detector (not shown). The laser diode outputs laser light. The optical system is composed of a polarized beam splitter and an objective lens. The detector detects reflected light of the magneto-optical record layer. The objective lens (not shown) of the optical head 13 is movably held by an actuator (not shown) in a tracking direction that is the radial direction of the disc and in a focusing direction of which the objective lens approaches and goes away from the disc.

A magnetic head 14 is disposed opposite to the optical head 13 through the optical disc 11B. In the record mode, the magnetic head 14 applies a vertical magnetic field modulated corresponding to record data to the optical disc 11B. The optical head 13 and the magnetic head 14 are connected each other. A moving mechanism 15 moves the optical head 13 and the magnetic head 14 in the radial direction of the optical disc 11B.

An output signal of the optical head 13 that detects reflected light of the optical disc 11B is supplied to an RF amplifier 16. The RF amplifier 16 performs an arithmetic process for an output signal of the detector of the optical head 13 and extracts a reproduction RF signal, a tracking error signal, a focus error signal, an address signal, and so forth from the output signal of the detector. The reproduction RF signal is supplied to an EFM (Eight To Fourteen Modulation) and error correction process encoder/decoder portion 17. The tracking error signal and the focus error signal are supplied from the RF amplifier 16 to the servo circuit 18. The address information is supplied from the RF amplifier to an address decoder 19. The address decoder 19 decodes the address information and outputs the decoded information as an absolute positon address.

The servo circuit 18 generates various servo drive signals corresponding to the tracking error signal and the focus error signal received from the RF amplifier 16 and corresponding to a track jump command, a seek command, and so forth received from a system controller 20. With the generated servo drive signals, the servo circuit 18 causes the actuator and thread mechanism 15 of the optical head 13 to perform focus and tracking controls.

The overall operation of the recording and reproducing apparatus is controlled by the system controller 20. The system controller 20 receives data from an operation key portion 21. The operation key portion 21 has a plurality of keys such as a reproduction key, stop key, FF key, REW key, and a record key.

The system controller 20 controls the display operation of a displaying portion 22. The displaying portion 22 displays the total reproduction time of the loaded optical disc 11B, the elapsed time of the currently reproduced music program, the remaining reproduction time of the currently reproduced music program, the total reproduction time, the track number of the currently reproduced music program, and so forth. When the optical disc loaded in the apparatus 10 is an optical disc on which the disk name and track names have been recorded, they are displayed on the displaying portion 22. When record dates of the disc and music programs have been recorded on the disc, the record date and time thereof are displayed on the displaying portion 22.

In the record mode, an analog audio signal is supplied to an input terminal 25. The analog audio signal is supplied to an A/D converter 26. The A/D converter 26 converts the analog audio signal into a digital audio signal at a sampling frequency of for example 44.1 kHz with 16 quantizing bits. The A/D converter 26 supplies the digital audio signal to an audio compression encoder/decoder 27.

The audio compression encoder/decoder 27 compresses a digital audio signal that has been processed corresponding to the above-described modified DCT method. The audio compression encoder/decoder 27 compresses the digital audio signal so that the data amount is decreased to around ⅕ of original size.

The audio data that is output from the audio compression encoder/decoder 27 is temporarily stored to a RAM 29 under the control of a memory controller 28. Data stored in the RAM 29 is supplied to the EFM and error correction process encoder/decoder 17. The EFM and error correction process encoder/decoder 17 performs an error correction code encoding process for the audio data that is read from the RAM 29. In addition, the EFM and error correction process encoder/decoder 17 modulates data with error correction code. Output data of the EMF and error correction process encoder/decoder 17 is supplied as record data to the magnetic head 14 through a magnetic head driving circuit 30.

The magnetic head driving circuit 30 supplies a magnetic head drive signal to the magnetic head 14 corresponding to the record data received from the encoder/decoder 17. In other words, the magnetic head 14 applies a vertical magnetic field that has been modulated corresponding to the record data to the optical disc 11B. At this point, the optical head 13 outputs laser light in a record level. Thus, the data received from the magnetic head 14 is recorded to the optical disc 11B.

Data received from the optical disc 11B are recorded as clusters to the optical disc 11B. One cluster is composed of 36 sectors. One sector (equivalent to one sub code block of a compact disc) is composed of 5.5 sound groups. 32 sectors of one cluster are effective data. The remaining four sectors are used for a linking area for timing the generation of the magnetic field of the magnetic head and controlling the laser power.

In the reproduction mode, the optical head 13 radiates laser light in a reproduction level to the optical disc 11B. The detector of the optical head 13 receives and detects the reflected light of the optical disc 11B and reads data from the optical disc 11B. An output signal of the detector of the optical disc 13 is supplied to the RF amplifier 16. As described above, the RF amplifier 16 outputs the reproduction RF signal, the tracking error signal, and the focus error signal. The reproduction RF signal is supplied to the EFM and error correction process encoder/decoder 17. The EFM and error correction process encoder/decoder 17 performs an EFM demodulating process and an error correction code correcting process for the reproduced RF signal.

An output signal of the EFM and error correction process encoder/decoder 17 is temporarily writtten to the RAM 29 under the control of the memory controller 28. The data read rate of the optical head 13 against the optical disc 11B and the transmission rate of data from the optical head 13 to the RAM 29 is 1.41 Mbit/sec. The data is intermittently read and transmitted.

On the other hand, data written on the RAM 29 is read at a timing of which the transmission rate of the reproduced data is 0.3 Mbits/sec and supplied to the audio compression encoder/decoder 27. The audio compression encoder/decoder 27 performs an decompressing process for the reproduction data that is read from the RAM 29. The decompressing process is an inverse process of the modified DCT compressing process.

A digital audio signal that is output from the audio compression encoder/decoder 27 is supplied to a D/A converter 31. The D/A converter 31 converts the digital audio signal received from the encoder/decoder 27 into an analog audio signal. The analog audio signal is output from the D/A converter 31 to an output terminal 22.

A digital audio interface 34 is connected to the audio compression encoder/decoder 27. With the digital audio interface 34, a digital audio signal can be directly input and output.

Data is written and read to/from the RAM 29 in such a manner that the memory controller 28 controls a write pointer and a read pointer so as to designate an address. The write pointer is incremented at a timing of 1.41 Mbits/sec.

On the other hand, the read pointer is incremented at a timing of 0.3 Mbits/sec. Due to the difference between the write bit rate and the read bit rate, a predetermined amount of data is stored in the RAM 39. When data is fully stored in the RAM 29, the incrementing operation of the write pointer is stopped. In addition, the data reading operation of the optical head 13 against the optical disc 11B is stopped. However, since the incrementing operation of the read pointer is continuously performed, an analog audio signal that is output from the output terminal 32 and a digital audio signal that is output from the interface 34 are not stopped.

Thereafter, only the reading operation of the RAM 29 is continuously performed. When the amount of data stored in the RAM 29 becomes equal to or less than a predetermined value, the data reading operation of the optical head 13 and the incrementing operation of the write pointer are resumed. Thus, data is read from the optical disc 11B and stored to the RAM 28.

Since a reproduction audio signal is output through the RAM 29, even if the tracking controlling operation is disordered due to an external disturbance or the like, the reproduction audio signal is not stopped. While data is stored in the RAM 29, the correct tracking/scanning position is accessed and data is read therefrom. Thus, the reproducing operation is continued without an influence of the reproduction output data.

As was described above, the optical disc 11B has the U-TOC area. In the U-TOC area, U-TOC data for managing user data is recorded. At sector 0 of U-TOC data of the U-TOC area, basic information and start/end addresses of each music program are recorded.

Figure 3:
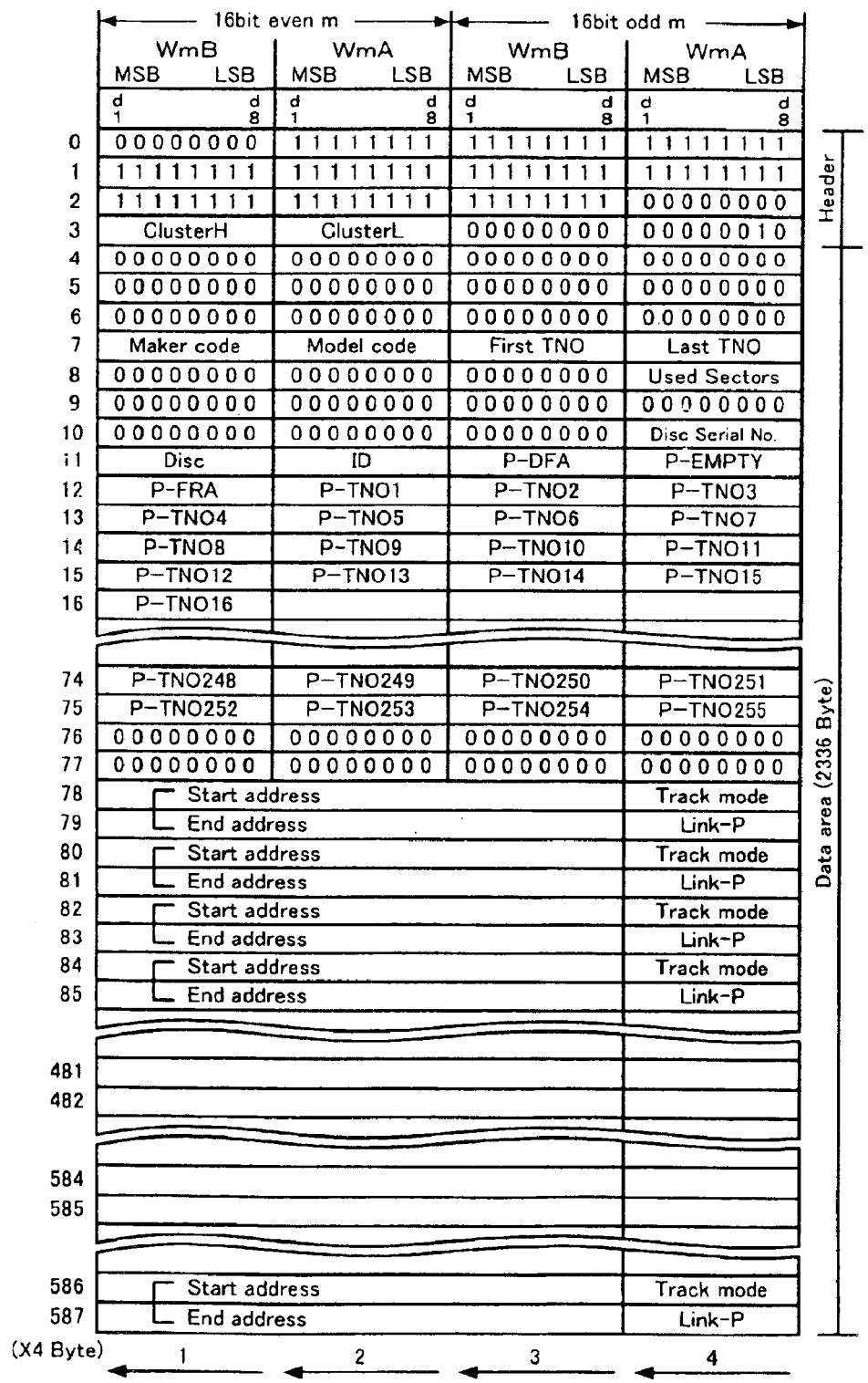
FIG. 3 is a schematic diagram for explaining U-TOC data used in a disc recording and reproducing apparatus.

FIG. 3 shows the structure of sector 0 of the U-TOC data. As shown in FIG. 3, a header is disposed at the beginning of sector 0 of the U-TOC data. The header has a predetermined bit pattern. The header is followed by maker code, model code, first music program number (First TNO) of music program data, last music program number (Last TNO) of music program data, sector used state (Used Sectors), disc serial number, disc ID, and so forth at predetermined addresses.

The disc ID data is followed by various table pointers that represent information of a music program record area and a free area. The table pointers are followed by sets of the start address of each part that composes data of a music program, the end address thereof, and mode information (track mode) thereof. Since a part represented by a particular part table may be linked to another part, link information (Link-P) that represents the start address and the end address of the linked parts is recorded.

The byte position of each pointer is obtained by the following formula.

$$76 \times 4 + (\text{pointer}) \times 8$$

The table pointer P-DFA is a pointer that represents the position of the top part table of a defect area of the record and reproduction area. In other words, when there is a defect part, the part table corresponding to the table pointer P-DFA represents the start/end addresses of a defect portion. In addition, the position of the part table is represented with link information Link-P). When there is no more defect part, link information (Link-P) is for example (00h) that represents no more link.

Table pointer P-EMPTY is a pointer that represent the positon of the top part table of unused part tables. A part table corresponding to the table pointer P-EMPTY represents the start/end addresses of the unused areas. When there are a plurality of unused part tables, link information (Link- P) successively represents the positions of the part tables. When there is no more unused area, link information (Link-P) is for example (00h) that represents no more link.

Table pointer P-FRA is a pointer that represents the position of the top part table of a writable free area (including an erased area). When there are a plurality of such parts (namely, there are a plurality of part tables), link information (Link-P) successively represents part tables. When there are no more free areas, link information (Link-P) is for example (00h) that represents no more link.

Table pointers P-TNO1 to P-TNO255 are pointers that represents the positions of the top part tables of individual music programs. In other words, table pointer P-TNO1 represents the position of a part table having the start/end addresses of data of a first music program. Table pointer P-TNO2 represents the position of a part table having the start/end addresses of data of a second music program. Table pointer P-TNO3 represents the position of a part table having the start/end addresses of data of a third music program. Data of one music program may be recorded in a plurality of parts that are dispersed or discreet (physically disconnected) in the record and reproduction area of the optical disc 11B. When one music program is divided and recorded as a plurality of parts, link information (Link-P) represents the positions of the part tables. When the music program is not continued to another part table, link information (Link-P) is for example (00h) that represents no more part table that is linked.

Figure 4:
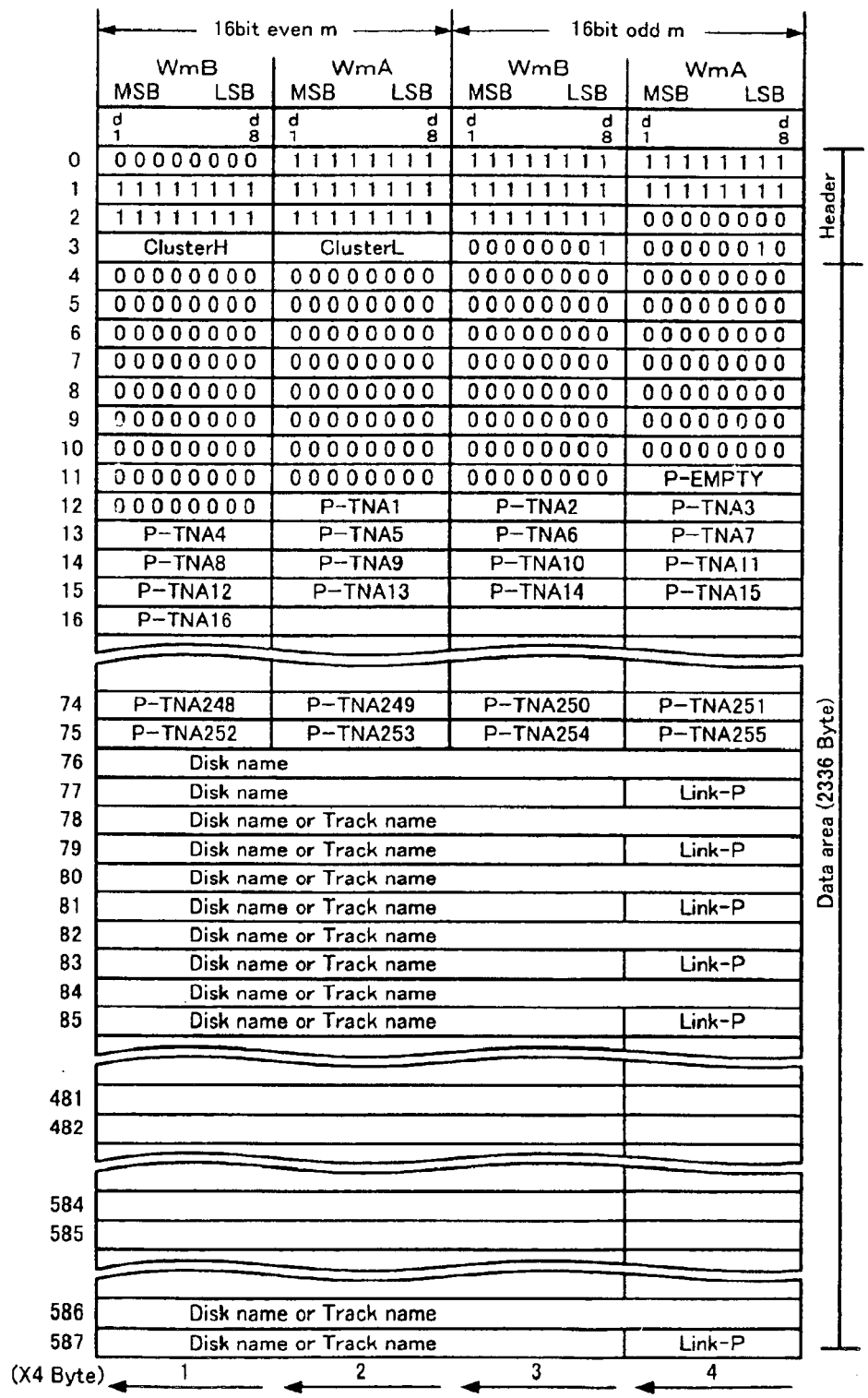
FIG. 4 is a schematic diagram for explaining U-TOC data used in the disc recording and reproducing apparatus.

FIG. 4 shows the structure of sector 1 of U-TOC data. As shown in FIG. 4, a header is disposed at the beginning of sector 1 of the U-TOC data. The header has a predetermined bit pattern as with sector 0 of the U-TOC data. The header is followed by table pointers P-EMPTY, P-TNA1, P-TNA2, . . .

Table pointer P-EMPTY is a pointer that represents the position of an unused part table. A slot corresponding to table pointer P-EMPTY has link information Link-P that represents the start positon of the next unused part table.

Table pointers P-TNA1, P-TNA2, . . . are table pointers that represent the track names of individual tracks. A disc name or track names of which relevant parts start are recorded at positions represented by table pointers P-TNA1, P-TNA2, . . . Since a part represented by a particular part table may be linked to another part, link information (Link-P) that represents the position of a part table that has a disc name or a track name of the linked part is recorded.

Figure 5:
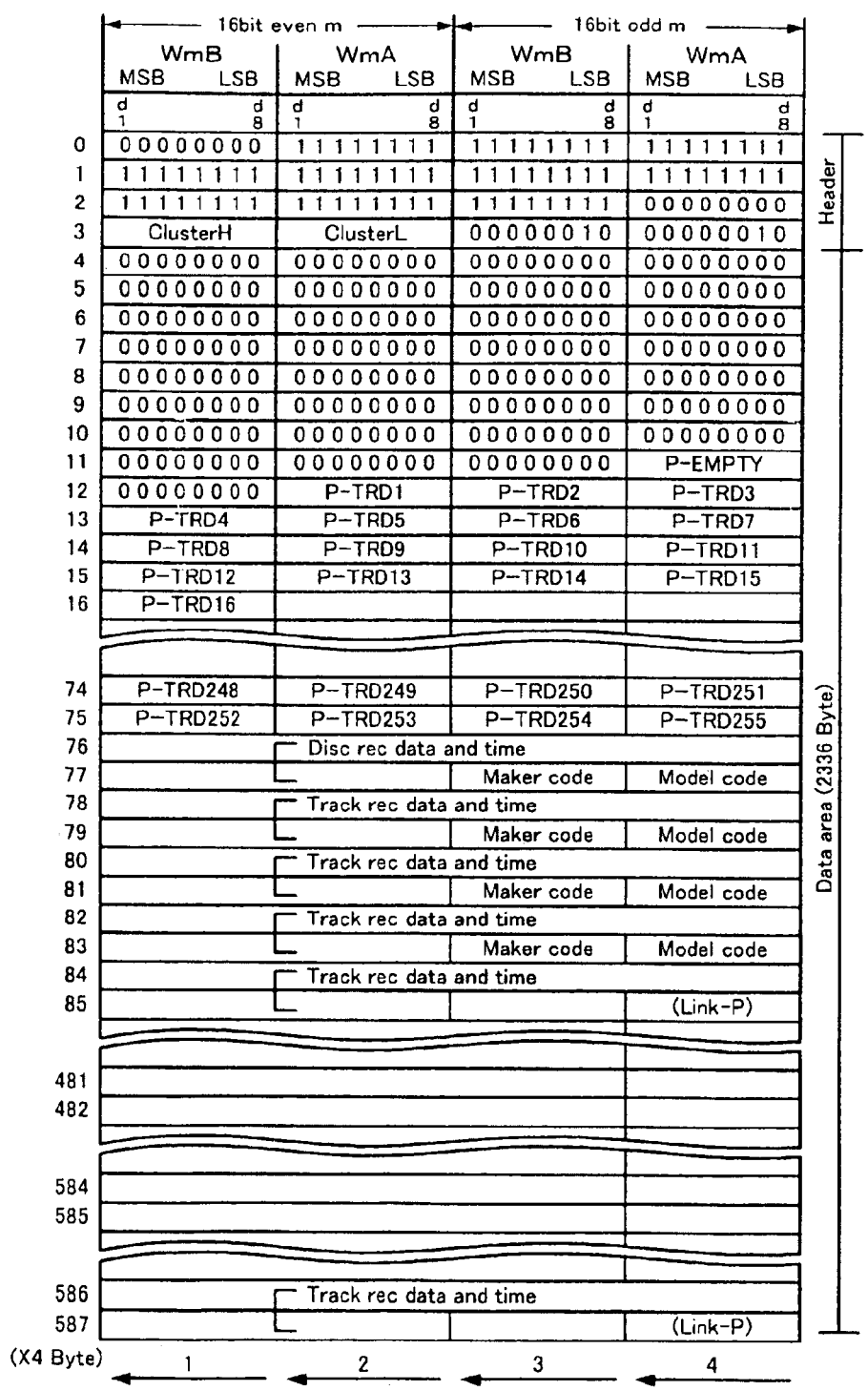
FIG. 5 is a schematic diagram for explaining U-TOC data used in the disc recording and reproducing apparatus.

FIG. 5 shows the structure of sector 2 of U-TOC. As shown in FIG. 5, a header is disposed at the beginning of sector 2 of U-TOC. The header has a predetermined bit pattern as with sectors 0 and 1 of U-TOC data. The header is followed by table pointers P-EMPTY, P-TRD1, P-TRD2, . . . and so forth.

Table pointer P-EMPTY is a pointer that represents the position of an unused part table. A slot corresponding to table pointer P-EMPTY has link information Link-P that represents the top position of the next unused part table.

Table pointers P-TRD1, P-TRD2, . . . are table pointers that point the positions of record date/time of individual tracks. Part record date/time, maker code, and model code are recorded at positions corresponding to table pointers P-TRD1, P-TRD2, . . .

Since a part corresponding to a particular part table may be linked to another part, link information (Link-P) that represents the position of a part table having record date/time, maker code, and model code of a part to be linked is recorded.

Thus, information of each track of the U-TOC data contains information Link-P. At sector 0 of the U-TOC data, Link-P represents the next linked music program data. At sector 1 of the U-TOC data, Link-P represents the next linked music program name. At sector 2 of the U-TOC data, Link-P represents the next linked record date/time data. Thus, a program can be easily erased. Two programs can be easily joined. In addition, the number of characters of a particular track name can be easily increased.

Figure 6:
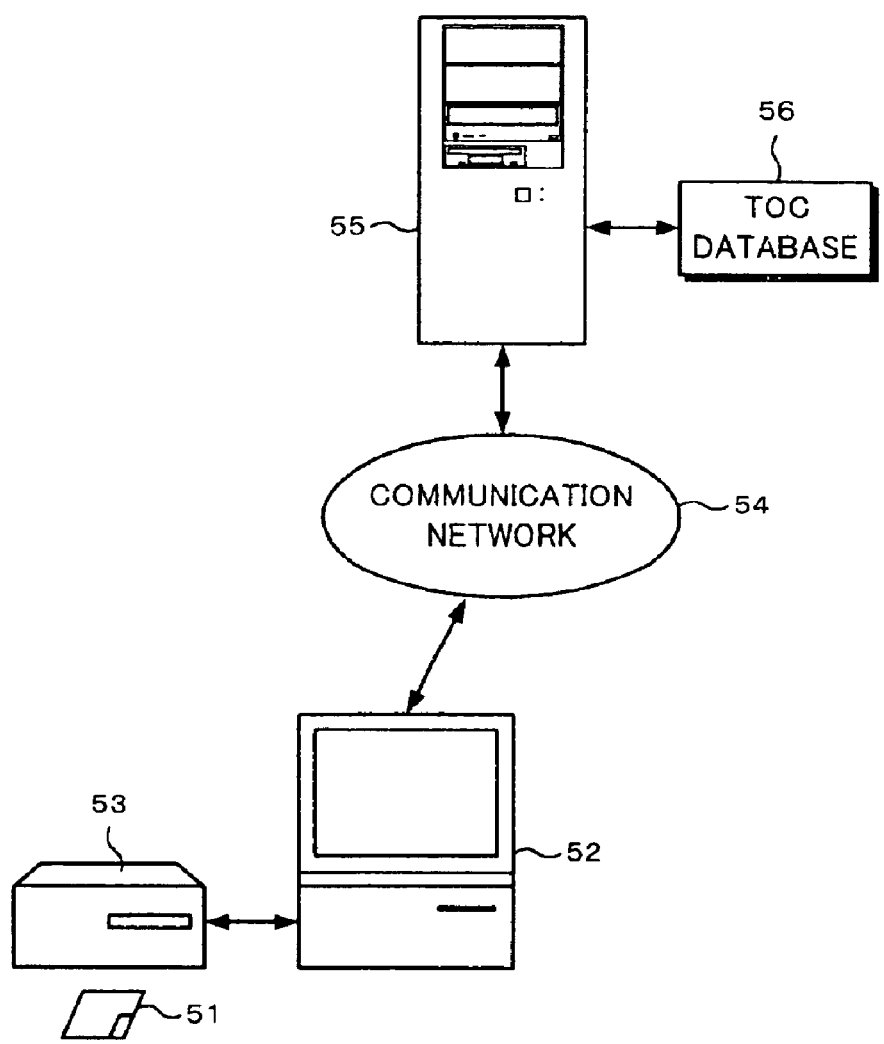
FIG. 6 is a block diagram showing an example of the structure of a system according to the present invention.

FIG. 6 shows an example of the structure of a system according to the present invention. In this system, a demonstration disc is distributed to a user. When the user likes a music program recorded on the disc, he or she can purchase the data of the music program.

Referring to FIG. 6, a disc 51 is an optical disc distributed as a new music program demonstration disc to the user. The disc 51 is for example a record and reproduction type disc shown in FIG. 1B or a hybrid type disc shown in FIG. 1C. Music program data is recorded in the program area of the disc 51. On such discs, the above-described TOC data has been recorded corresponding to music program data. However, in the example shown in FIG. 6, although music program data has been correctly recorded, TOC data corresponding thereto has been imperfectly recorded. For example, TOC data is recorded so that all music programs cannot be accessed or only the first music program can be accessed. Thus, when the TOC data has been imperfectly recorded, even if music program data has been perfectly recorded, since the TOC data is imperfect, the recorded music program data cannot be reproduced from the disc.

To allow music program data recorded on the disc 51 to be reproduced, the imperfect TOC data should be rewritten to perfect TOC data. To do that, data communication is used.

In other words, in FIG. 6, to allow music program data recorded on the disc 51 to be reproduced, TOC data on the disc 51 is rewritten to perfect TOC data. In this case, a recording and reproducing apparatus 53 is connected to a terminal unit 52 of the user. The disc 51 is loaded to the recording and reproducing apparatus 53. The structure of the recording and reproducing apparatus 53 is the same as the structure of the recording and reproducing apparatus 10 shown in FIG. 2.

The terminal unit 52 of the user is composed of for example a personal computer. Application software that allows the terminal unit 52 to communicate with a server 55 and the TOC data recorded on the disc 51 to be rewritten has been installed to the terminal unit 52. The server 55 is a server of an information center that distributes the disc 51. The server 55 has a TOC database 56 containing a plurality of types of TOC data corresponding to data of music programs of a plurality of discs.

When the application program of the terminal unit 52 of the user is executed, the terminal unit 52 of the user is connected to the server 55 through a communication network 54. TOC data corresponding to the disc 51 loaded in the recording and reproducing apparatus 53 is read from the server 55 and the TOC data is transmitted to the terminal unit 52 of the user through the communication network 54. The TOC data recorded on the disc 51 loaded in the apparatus 53 is rewritten corresponding to the TOC data received from the server 55. Since the TOC data recorded on the disc 51 is rewritten to perfect TOC data, the music program data recorded on the disc 51 can be reproduced.

In the system shown in FIG. 6, as the disc 51, a hybrid type disc shown in FIG. 1C is used. Music program data has been recorded in the reproduction-only area of the hybrid type disc. Thus, music program data can be prevented from being mistakenly overwritten with other music program data. When a second TOC area for recording original data different from the above-described TOC data is disposed in for example the reproduction-only area and the second TOC area is used as an auxiliary TOC area, the disc 51 loaded in the apparatus 53 can be identified. Thus, the music program data recorded on the disc 51 can be easily obtained. In addition, the TOC data corresponding to the music program data can be easily searched on the server 55 side.

For example, it is assumed that a management number for the disc 51 has been recorded in the second TOC area. The management number recorded in the second TOC area of the disc 51 is a unique management number for identifying the disc 51. A program for reading the management number of the second TOC has been recorded in the reproduction-only area of the disc 51. Alternatively, when the application program is executed, the management number of the second TOC is read.

Thus, when the application program is executed, the management number of the disc 51 is transmitted to the server 55. The server 55 identifies the disc 51 corresponding to the management number received from the terminal unit 52. The server 55 searches information of the number of music programs, the program order thereof, and the music program names thereof from the TOC database 56. The user selects a desired music program corresponding to the information searched from the database 56. When the user selects the desired music program, the server 55 transmits TOC data that allows the selected music program data to be reproduced to the terminal unit 52 of the user. The terminal unit 52 of the user receives the TOC data from the server 55 and records the TOC data as U-TOC data to the disc 51 loaded in the apparatus 53.

The recording and reproducing apparatus 53 and the terminal unit 52 of the user may be wirelessly connected using an infrared ray as well as a cable. In addition, the communication network 54 may be a wireless communication network as well as a wired communication network such as ISDN.

Figure 7:
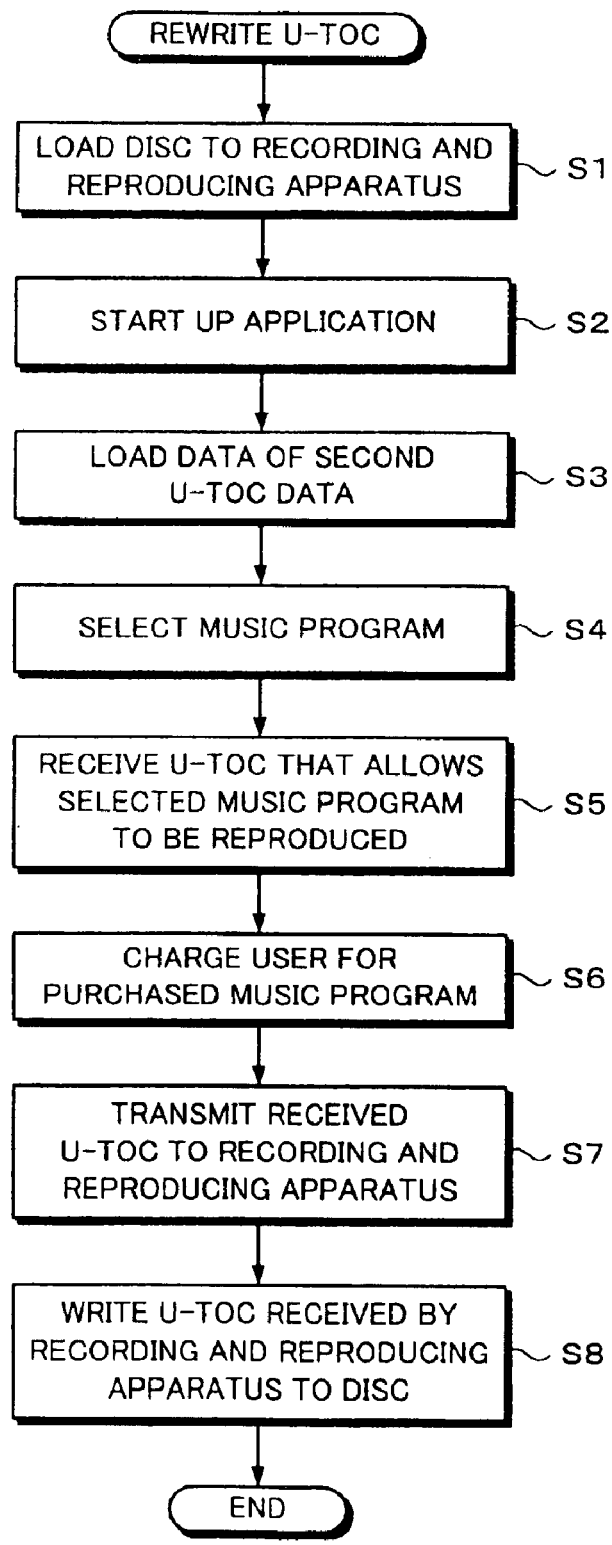
FIG. 7 is a flow chart for explaining an example of the system according to the present invention.

FIG. 7 is a flow chart showing a U-TOC data rewriting process in the case that the management number of the disc 51 has been recorded to the second TOC area.

In FIG. 7, the disc 51 is loaded to the recording and the reproducing apparatus 53 connected to the terminal unit 52 of the user (at step S1).

The application program of the terminal unit 52 of the user is started up. When the application program is started up, the terminal unit 52 of the user can exchange data with the server 55 connected thereto through the communication network 54 (at step S2).

The terminal unit 52 of the user transmits a load command for data recorded in the second TOC area to the recording and reproducing apparatus 53. When the recording and reproducing apparatus 53 receives the load command from the terminal unit 52, the recording and reproducing apparatus 53 accesses the second TOC area of the disc 51 loaded to the apparatus 53 and reads data from the second TOC area. As described above, the management number of the disc has been recorded in the second TOC area. The terminal unit 52 of the user loads or reads data from the second TOC area (at step S3).

The data of the second TOC area is transmitted from the terminal unit 52 of the user to the server 55. The server 55 obtains information of the number of music programs, the program order thereof, and the program names thereof corresponding to the management number of the second TOC area of the disc 51 and transmits the obtained information to the terminal unit 52 of the user through the communication network 54. The terminal unit 52 of the user displays the number of music programs, the program order thereof, and the program names thereof to the displaying portion of the terminal unit 52 or the displaying portion of the recording and reproducing apparatus 53. The user selects a desired music program on the displaying portion with the operating portion of the terminal unit 52 (at step S4).

After the user has selected the desired music program, information of the selected music program is transmitted to the server 55. The server 55 generates U-TOC data that allows the selected music program to be reproduced or reads such U-TOC data from the database 56. The server 55 transmits the U-TOC data to the terminal unit 52 of the user through the communication network 54. The terminal unit 52 of the user receives the U-TOC data from the server 55 (at step S5).

A charging process for purchased music program data is performed between the server 55 and the terminal unit 52. As examples of the charging methods, a pre-paid card, electronic money, a credit card, and so forth are used and the money corresponding to the purchased music program data is reduced from the bank account of the user and the money collected using such means is transferred to a designated bank account (at step S6).

After the charging process has been performed, the terminal unit 52 of the user transmits the received U-TOC data to the recording and reproducing apparatus 53. The recording and reproducing apparatus 53 records the received U-TOC data to the disc 51 or rewrites the current U-TOC data recorded on the disc 51 with the received U-TOC data. Thus, the purchased music program data can be reproduced (at step S8). For example, the received U-TOC data is input through an interface of the apparatus 53. Thereafter, the U-TOC data is temporarily stored to the RAM. The optical head and the magnetic head access the U-TOC area of the disc 51 and rewrite the current U-TOC data with the received U-TOC data. Whenever music program data is purchased, the U-TOC data can be rewritten. Alternatively, when the disc 51 is unloaded from the apparatus 53, the U-TOC data may be rewritten. The U-TOC data received from the server 55 is the minimum data that allows the purchased music program data to be reproduced.

When TOC data for all music programs of the disc 51 has been recorded in the second TOC area, the TOC data for the purchased music program is read from the database 56 of the server 55 and copied to the U-TOC area.

Figure 8:
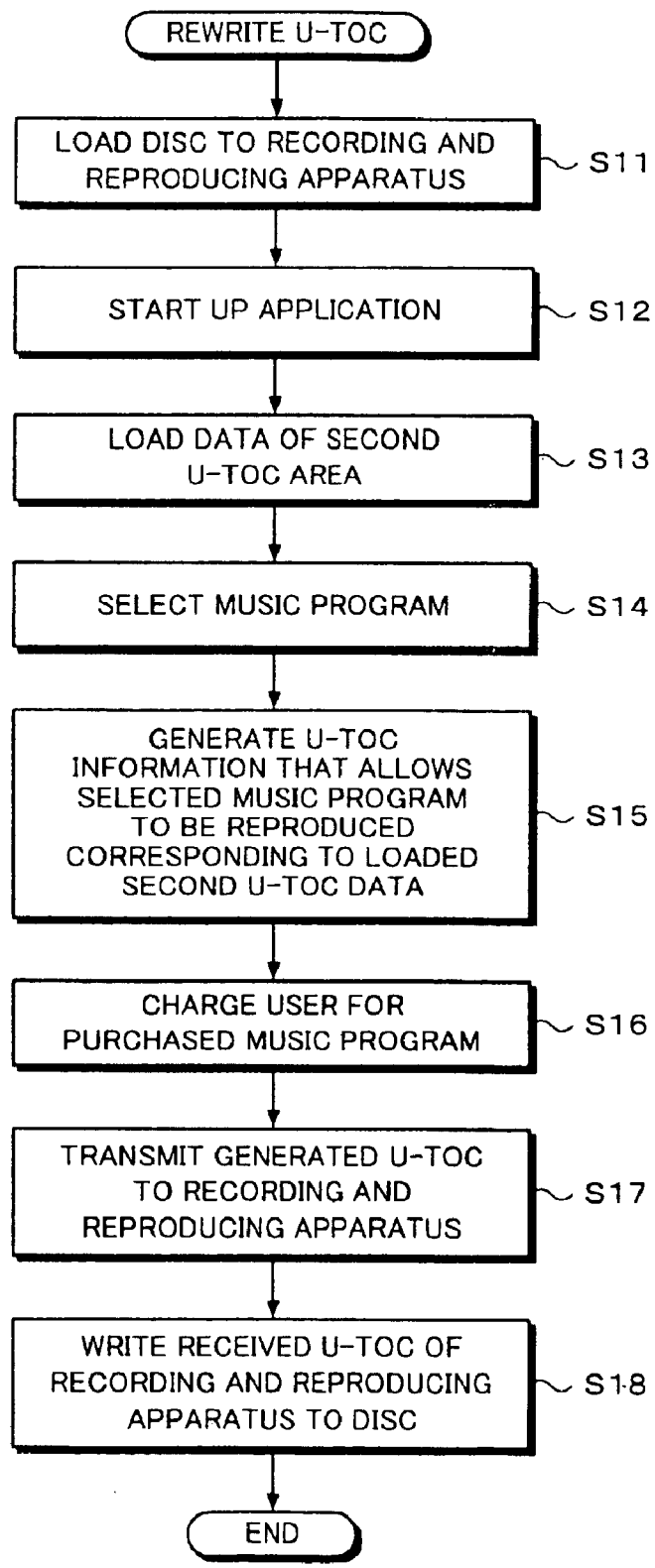
FIG. 8 is a flow chart for explaining an example of the system according to the present invention.

FIG. 8 is a flow chart showing a U-TOC data rewriting process in the case that information of all music programs (for example, information of music program names) recorded on the disc 51 has been registered to the second TOC area.

In FIG. 8, the disc 51 is loaded to the recording and reproducing apparatus 53 connected to the terminal unit 52 of the user (at step S1).

The application program of the terminal unit 52 of the user is started up. When the application program is started up, the terminal unit 52 of the user is connected to the server 55 through the communication network 54. Thus, data can be exchanged between the terminal unit 52 of the user and the server 55 (at step S12).

The terminal unit 52 of the user transmits a load command for data recorded in the second TOC area to the recording and reproducing apparatus 53. When the recording and reproducing apparatus 53 receives the load command from the terminal unit 52 of the user, the recording and reproducing apparatus 53 accesses the second TOC area of the disc 51 loaded to the apparatus 53 and reads data from the second TOC area with the optical head. Since information of all music program names of music programs recorded on the disc 51 has been recorded in the second TOC area, when data recorded in the second TOC area is read, information of music program names of music programs recorded on the disc 51 is obtained (at step S13).

The terminal unit 52 of the user displays the number of music programs, the program order thereof, the program names thereof, and so forth corresponding to the information read from the second TOC area on the displaying portion of the terminal unit 52 or the displaying portion of the apparatus 53. The user selects a desired music program corresponding to information displayed on the displaying portion (at step S14).

After the user has selected a desired music program, for example the controlling portion of the terminal unit 52 generates U-TOC data that allows the purchased music program to be reproduced corresponding to the data that has been read from the second TOC area (at step S15).

A charging process for the purchased music program is performed between the server 55 and the terminal unit 52. As with step S6, as examples of the charging methods, a pre-paid card, electronic money, or a credit card may be used (at step S16).

After the charging process has been performed, the terminal unit 52 of the user transmits the generated U-TOC data to the recording and reproducing apparatus 53 (at step S17).

The recording and reproducing apparatus 53 records the U-TOC data received from the terminal unit 53 to the U-TOC area of the disc 51. Thus, the current U-TOC data on the disc 51 is rewritten so that the purchased music program can be reproduced (at step S18).

In the above-described example, the U-TOC data that has been recorded on the disc is imperfect U-TOC data. In this state, the music program data recorded on the disc cannot be reproduced. After the charging process has been performed between the server and the terminal unit, the imperfect U-TOC data on the disc is rewritten to perfect. U-TOC data. Thus, all or desired music program data can be reproduced. Such a system can be used for a music disc vending service.

In other words, when a new music program disc is sold, it is advertized on streets and with mass media. When a person sees such an advertisement and likes the new music program, he or she purchases a compact disc containing the music program at a disc store.

On the other hand, when the system shown in FIG. 6 is used, in addition to advertisements on streets and with mass media, discs having perfect music program data and imperfect U-TOC data may be distributed on streets and as appendixes of magazines. When a person likes a music program on the distributed disc, he or she selects the music program. Thus, the imperfect U-TOC data is rewritten with perfect U-TOC data through a communication network. Consequently, the person can purchase the music program data through the communication network.

The advertisement using such discs will be more effective than that on streets or with mass media. In addition, since a person can directly purchase a desired music program through the communication network, he or she does not need to go to a store that carries compact discs. In other words, both the music program vendor and the music program purchaser will have benefits.

When music program data is purchased through the communication network, data transmitted from the server is U-TOC data or the like. Since the data amount of TOC data is at most 9 kbytes, the downloading operation of the data is finished in a short time.

2. Other Examples of System

FIGS. 9A and 9B show other examples of a system according to the present invention. In the example shown in FIG. 6, the reproducing operation of music program data recorded on the disc is permitted or prohibited depending on whether TOC data as management data of the music program data is perfect or imperfect. Thus, the data amount of data downloaded from the server is reduced. In contrast, in the examples that follow, the reproducing operation of music program data is permitted or prohibited corresponding to charging information.

In FIGS. 9A and 9B, a server 101 is a server on an information center side that provides the user with services. The server 101 performs a charging process corresponding to information received from a charging processing unit 102 disposed in for example the house of the user and connected through a communication network. The server 101 and the charging processing unit 102 can be connected through a communication network 103. The communication network 103 may be a dedicated communication line or a computer network such as Internet.

A portable terminal unit 104 records or reproduces music program data. The portable terminal unit 104 has a hard disk drive for recording or reproducing music program data, a circuit for processing an audio signal that is recorded or reproduced, and so forth.

An information vending unit 105 is a unit for vending music program data. The information vending unit 105 has a hard disk drive and so forth. The hard disk drive of the information vending unit 105 stores data of many music programs. The service provider installs many information vending units 105 in disc stores and convenience stores and on streets.

The user purchases a desired music program from the information vending unit 105, stores the purchased music program data to the portable terminal unit 104, and enjoys the reproduction of the music program data stored and record in the portable terminal unit 104. When the user uses the service, he or she purchases the portable terminal unit 104 and the charging processing unit 102. Thereafter, the user contracts with the service provider which is a company or a person that (who) manages the information center. When the user contracts with the service provider for the service, the portable terminal unit 104 of the user can be connected to the server 101 of the information center controlled and managed by the service provider through the communication network 103.

As shown in FIG. 9A, when the user purchases music program data, he or she will take the portable terminal unit 104 to the place of the information vending unit 105 and connect the portable terminal unit 104 to the information vending unit 105. The information vending unit 105 has stored data of many music programs. When the portable terminal unit 104 is connected to the information vending unit 104, a list of purchasable music programs and a search screen are displayed on the displaying portion of the information vending unit 105. The user can select a desired music program from a plurality of music programs stored in the information vending unit 105 with the operating portion of the information vending unit 105.

When the user has selected a music program that he wants to purchase with the operating portion of the information vending unit 105, the selected music program data is transmitted from the hard disk drive of the information vending unit 105 to the portable terminal unit 104. Thus, the music program data received from the information vending unit 105 is recorded to the hard disk drive of the portable terminal unit 104.

When the user purchases music program data, it is necessary to perform the charging process for the purchased music program data. When or before the user purchases music program data, the information vending unit 105 side may perform the charging process. However, when the information vending unit 105 side performs the charging process, it will take a long time for the charging process and music program downloading process. Thus, other users would wait for a long time. In addition, the charging process and/or music program downloading process maybe illegally performed.

To prevent such a problem, in the example, as shown in FIG. 9B, the portable terminal unit 104 is connected to the charging processing unit 102. When the portable terminal unit 104 is connected to the charging processing unit 102, the charging processing unit 102 is connected to the server 101 through the communication network 103. The charging processing unit 102 is connected to the server 101. The charging processing unit 102 performs the charging process corresponding to the music program data (for example, corresponding to the number of music programs) purchased through the information vending unit 105.

In this example, the information vending unit 105 only provides the user with music program data. In contrast, the charging processing unit 102 disposed in for example the house of the user performs the charging process for the purchased music program data.

Figure 10:
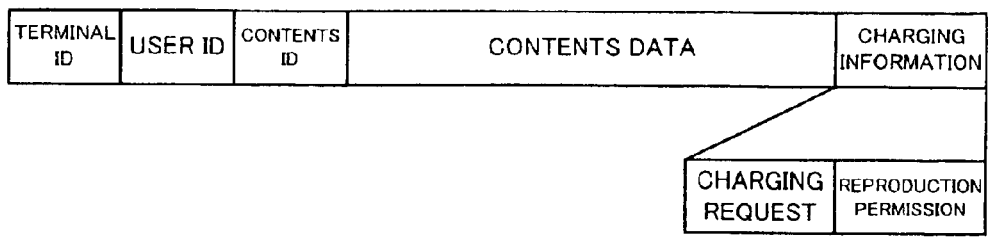
FIG. 10 is a schematic diagram for explaining another example of a system according to the present invention.

In other words, as-shown in FIG. 10, data transmitted from the information vending unit 105 to the portable terminal unit 104 includes content data (music program data), terminal ID data as unique information of the portable terminal unit 104, user ID data as user identification data, content ID data as music identification data, and charging information. The terminal ID data is written to the RAM of the portable terminal unit 104 before it is shipped. On the other hand, the user ID data is written to the RAM when he or she purchases the portable terminal unit 104. The charging information includes for example charging request information and reproduction permission information.

While the charging operation is not being performed, for example a reproduction permission flag is in off state. When the reproduction permission information is in the off state, music program data transmitted to the terminal unit 104 cannot be reproduced.

To allow the music program data to be reproduced, it is necessary to connect the portable terminal unit 104 to the charging processing unit 102 disposed in the house of the user, establish communication between the charging processing unit 102 and the server 101 of the service provider, and perform the charging process. When the charging process is executed, the reproduction permission information is placed in an on state (namely, the reproduction permission flag is placed in an on state). When the reproduction permission information is placed in an the on state, the portable terminal unit 104 can reproduce the music program data.

In the example, the portable terminal unit 104 and the information vending unit 105 are directly and mechanically connected. Alternatively, the portable terminal unit 104 and the information vending unit 105 may be wirelessly connected. Likewise, the portable terminal unit 104 and the charging processing unit 102 may be wirelessly connected. In addition, the communication network 103 between the charging processing unit 102 and the server 101 may be a wireless communication network as well as a wired communication network such as ISDN, telephone network, or the like.

Figure 11:
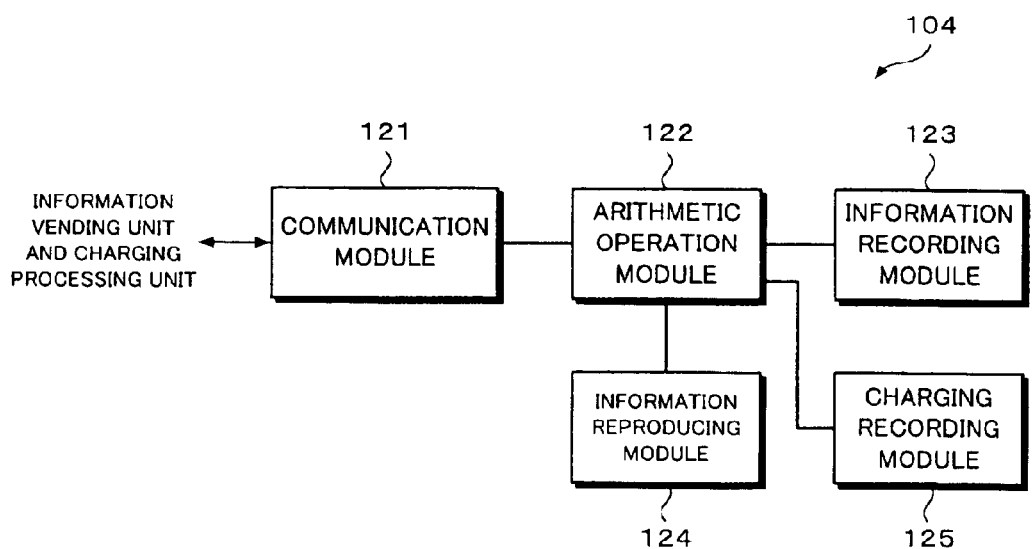
FIG. 11 is a functional block diagram for explaining the structure of a portable terminal unit as another example of a system according to the present invention.
Figure 12:
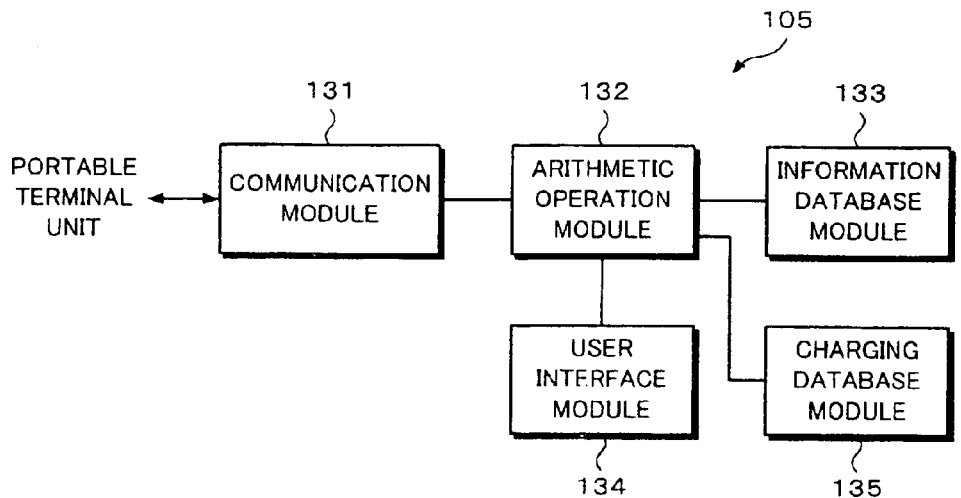
FIG. 12 is a functional block diagram for explaining the structure of an information vending unit as another example of a system according to the present invention.
Figure 13:
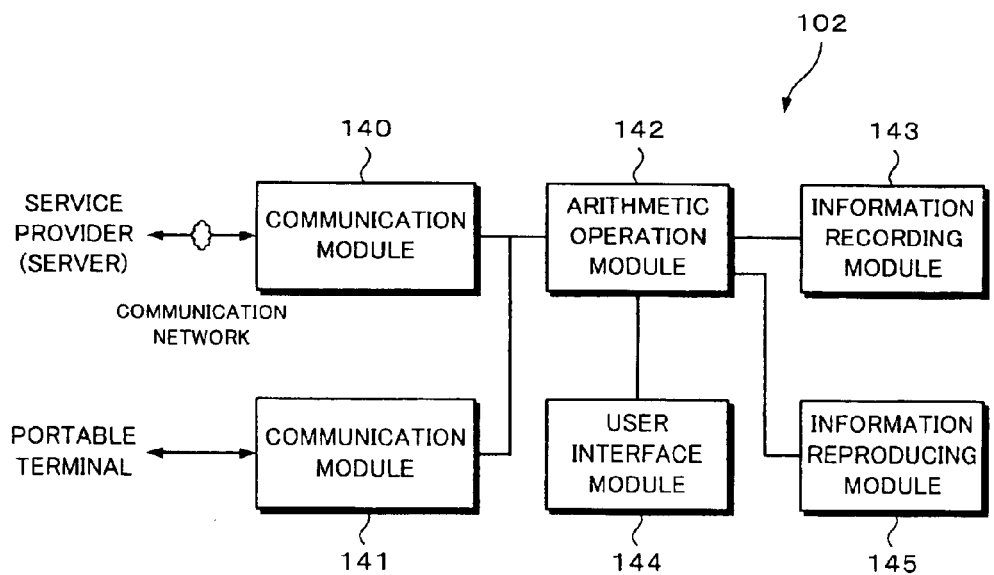
FIG. 13 is a functional block diagram for explaining the structure of a charging processing unit as another example of a system according to the present invention.
Figure 14:
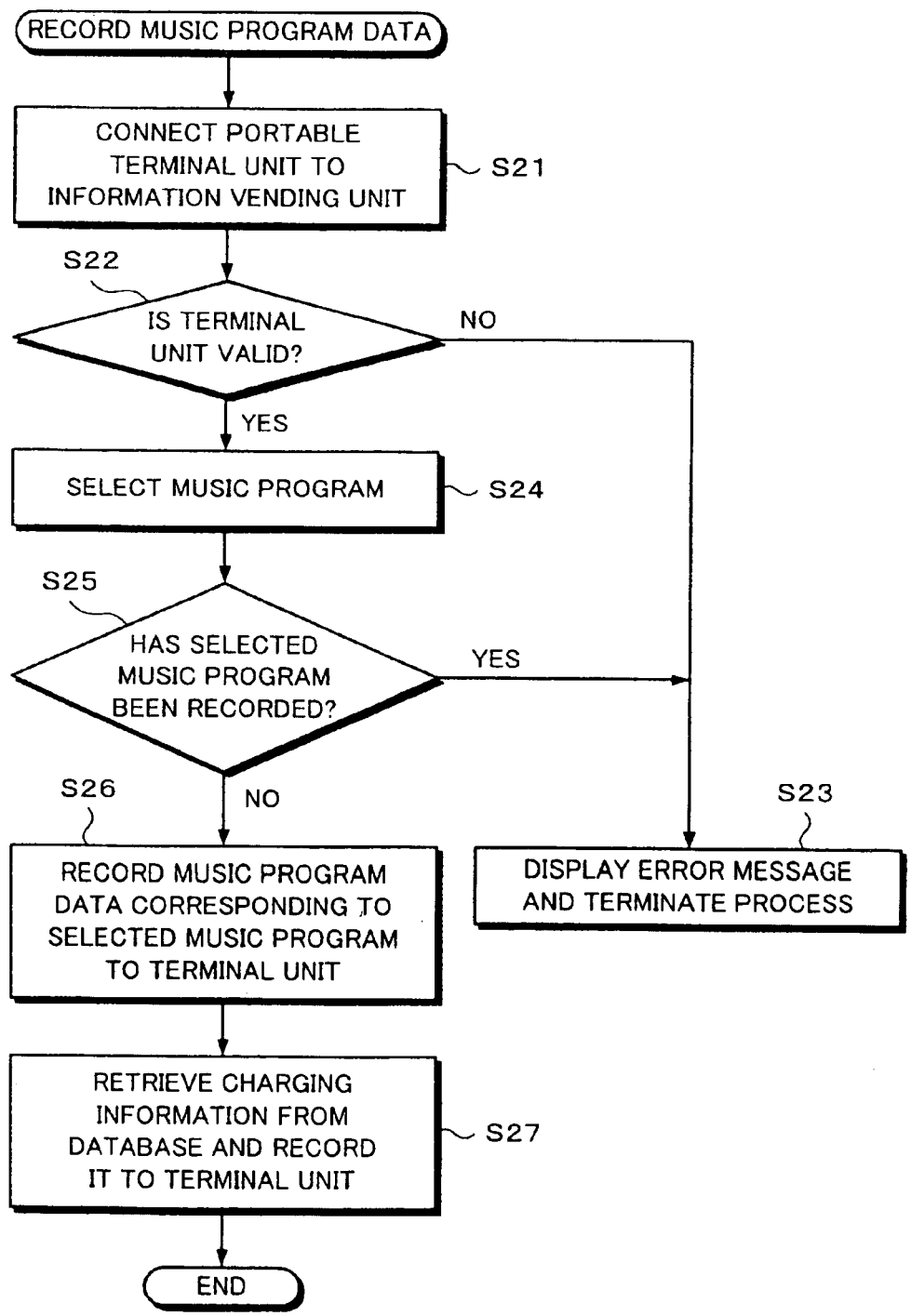
FIG. 14 is a flow chart for explaining a process of another example of a system according to the present invention.
Figure 15:
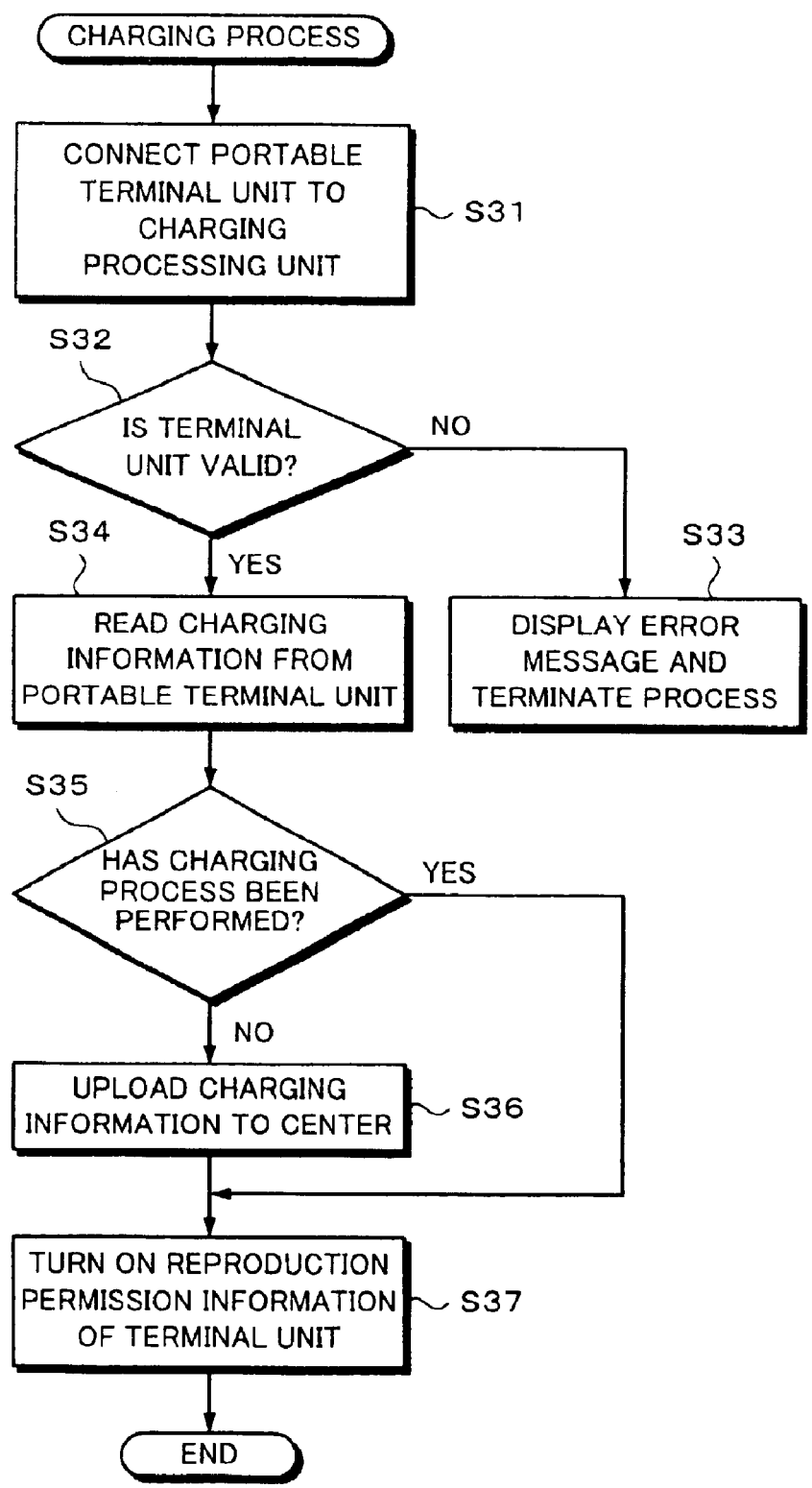
FIG. 15 is a flow chart for explaining a process of another example of a system according to the present invention.

FIGS. 11 to 13 are functional block diagrams showing the structures of the portable terminal unit 104; the information vending unit 105, and the charging processing unit 102. FIG. 14 is a flow chart showing a process in the case that the portable terminal unit 104 is connected to the information vending unit 105 and music program data received from the information vending unit 105 is transmitted to the portable terminal unit 104. FIG. 15 is a flow chart showing a process in the case that the portable terminal unit 104 is connected to the charging processing unit 102 and the charging process is performed therebetween.

As shown in FIG. 11, the portable terminal unit 104 comprises a communication module 121, an arithmetic operation module 122, an information recording module 123, an information reproducing module 124, and a charging recording module 125. The communication module 121 is connected to the information vending unit 105 and the charging processing unit 102. The communication module 121 exchanges data with the information vending unit 105 and the charging processing unit 102. The arithmetic operation module 122 controls the overall operation of the portable terminal unit 104. The information recording module 123 is a hard disk drive that records music program data. The information reproducing module 124 performs a reproducing process for music program data that is read from the information recording module 123. The charging recording module 125 performs a charging process. As shown in FIG. 12, the information vending unit 105 comprises a communication module 131, an arithmetic operation module 132, an information recording module 133, a user interface module 134, and a charging database module 135. The communication module 131 is connected to the portable terminal unit 104. The communication module 131 exchanges data with the portable terminal unit 104. The information recording module 133 is composed of for example a hard disk drive that records a plurality of music programs. The user interface module 134 is composed of an operation button portion and a displaying portion. The charging database module 135 performs a charging process in association with the charging processing unit 102. As shown in FIG. 13, the charging processing unit 102 comprises a communication module 140, a communication module 141, an arithmetic operation module 142, an information recording module 143, a user interface module 144, and an information reproducing module 145. The communication module 140 is connected to the server 101. The communication module 141 is connected to the portable terminal unit 104. The arithmetic operation module 142 performs an authenticating process for the terminal unit 104 (the authenticating process will be described later) and controls the overall operations of the processing unit 102. The information recording module 143 records data necessary for the authenticating process for the terminal unit 104.

In FIG. 14, when the portable terminal unit 104 is connected to the information vending unit 105, data can be communicated between the communication module 121 of the portable terminal unit 104 and the communication module 131 of the information vending unit 105 (at step S21). The arithmetic operation module 132 of the information vending unit 105 performs an authenticating process for the portable terminal unit 104 corresponding to the terminal ID data and the user ID data so as to determine whether or not the portable terminal unit 104 is a valid unit for receiving the service (at step S22). When the determined result at step S22 is No (namely, the portable terminal unit 104 is not a valid unit for receiving the service), the arithmetic operation module 132 causes the displaying portion of the information vending unit 105 or the displaying portion of the terminal unit 104 to display an error message and terminates the process (at step S23). When the determined result at step S22 is Yes (namely, the portable terminal unit 104 is a valid unit for receiving the service), the user selects a desired music program corresponding to information displayed on the displaying-portion of the information vending unit 105 with the operating portion (for example, operation button portion) of the user interface module 134 (at step S24). At this point, the arithmetic operation module 122 of the portable terminal unit 104 compares information (music program data) recorded on the hard disk of the information recording module 123 with the music program selected by the user and determines whether or not the selected music program has been recorded on the hard disk of the information recording module 123 (at step S25). When the determined result at step S25 is Yes (namely, the selected music program has been recorded on the hard disk), the flow advances to step S23. At step S23, the arithmetic operation module 122 causes the displaying portion to display an error message and terminates the process. When the determined result at step S25 is No (namely, the selected music program has not been recorded on the hard disk), the arithmetic operation module 132 transmits the selected information to the information vending unit 105 through the communication module 121 and transmits a transfer command for the selected music program to the portable terminal unit 104 (at step S26). At this point, the information vending unit 105 transmits charging information of the charging recording database 135 to the charging recording module 125 of the portable terminal unit 104. The music program data and the charging information received from the information vending unit 105 are recorded to the hard disk drive of the information recording module 123 of the portable terminal unit 104.

In FIG. 15, to perform a charging process between the portable terminal unit 104 and the charging processing unit 102, the portable terminal unit 104 is connected to the charging processing unit 102 (at step S31). Thus, data can be communicated between the communication module 141 of the charging processing unit 102 and the communication module 121 of the portable terminal unit 104. After the charging processing unit 102 and the portable terminal unit 104 have been connected, the charging processing unit 102 performs an authenticating process for the portable terminal unit 104 corresponding to the terminal ID data so as to determine whether or not the portable terminal unit 104 is a valid unit for receiving the service (at step S32). When the determined result at step S32 is No (namely, the portable terminal unit 104 is not a valid unit), the charging processing unit 102 causes the displaying portion to display an error message and terminates the process (at step S33). When the determined result at step S32 is Yes (namely, the portable terminal unit 104 is a valid unit), the charging module 125 of the portable terminal unit 104 reads charging information from the hard disk drive of the terminal unit 104 and transmits the charging information to the charging processing unit 102. When the charging processing unit 102 receives the charging information from the unit 104, the arithmetic operation module 142 of the charging processing unit 102 compares the charging information with data in the charging database of the information recording module 143 of the charging processing unit 102 and determines whether or not the charging information has been processed (at step S35). When the determined result at step S35 is No (namely, the charging information has not been processed), the charging processing unit 102 is connected to the serve 101 through the communication module 140 and the communication network 103. The communication module 140 of the charging processing unit 102 transmits the charging information that has been read from the portable terminal unit 104 to the server 101 through the communication network 103. The server 101 performs a charging process corresponding to the charging information received from the charging processing unit 102 as with step S6 shown in FIG. 7 and step S16 shown in FIG. 8 (at step S36). Thereafter, the charging processing unit 102 transmits a charging process completion message to the portable terminal unit 104. When the portable terminal unit 104 receives the charging process completion message from the charging processing unit 102, the portable terminal unit 104 causes the reproduction permission information recorded on the hard disk to be turned on (the reproduction permission flag to be turned on) (at step S37). When the reproduction permission information is turned on at step S37, the music program data recorded on the hard disk of the portable terminal unit 104 can be reproduced. In other words, the information reproducing module 124 can reproduce music program data. When the determined result at step S35 is Yes (namely, the charging information has been processed), the flow advances to step S37. At step S37, the charging processing unit 102 causes the reproduction permission information of the charging information recorded on the hard disc to be turned on (namely, the reproduction permission flag to be turned on). For example, the charging processing unit 102 causes the reproduction permission information flag of the charging information recorded on the hard disk of the terminal unit 104 to be turned on or rewrites information that represents the permission of the reproducing operation.

In the above-described example, the charging information includes the reproduction permission information. By turning on the reproduction permission information, the reproducing operation of music program data stored in the portable terminal unit is permitted. Alternatively, when charging information has been recorded corresponding to music program data that the user wants to reproduce, the music program data may be prohibited from being reproduced. After the charging process for the music data program has been performed, the charging information is erased. Thus, the music program data can be reproduced. In contrast, when music program data to be reproduced does not have charging information, the music program data can be reproduced.

Figure 16:
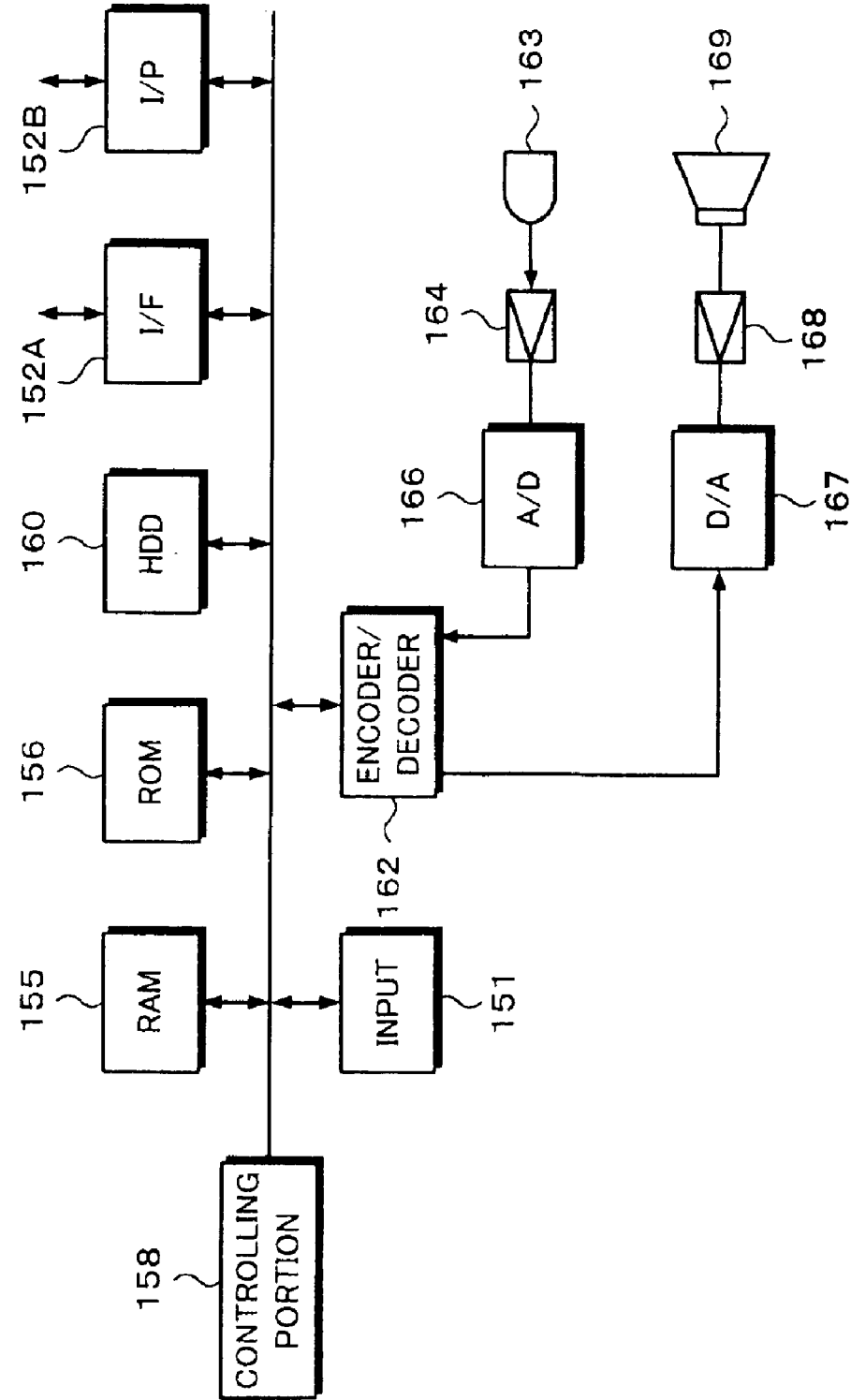
FIG. 16 is a block diagram showing the structure of a portable terminal unit as another example of a system according to the present invention.

Next, the structure of the portable terminal unit 104 will be descried in detail. FIG. 16 shows the structure of the portable terminal unit 104. In FIG. 16, the portable terminal unit 104 has an input portion composed of a pushing and rotating key. Alternatively, the input portion 151 may be a rotating and pushing type key (referred to as jog dial) or a touch panel on an LCD device of the displaying portion. When the user operates the input portion 151, an operation selection signal, an operation start signal, and an operation stop signal are output corresponding to the operation of the input portion 151. Corresponding to the input operation signal, the operation of the terminal unit 104 is set. To easily input a music program name, an artist name, and so forth of music program data that is stored in the hard disk drive of the terminal unit 104, a keyboard may be connected to the portable terminal unit 104 through an infrared interface driver or a USB (Universal Serial Bus) driver.

The portable terminal unit 104 can be connected to the information vending unit 105 and the charging processing unit 102 through interfaces 152A and 152B, respectively. Data is exchanged between the information vending unit 105 and the charging processing unit 102 through the interfaces 152A and 152B, respectively. The portable terminal unit 104 has a RAM 155, a ROM 156, and a HDD (Hard Disk Drive) 160. A controlling portion 158 of the portable terminal unit 104 is composed of a microcomputer or the like. The controlling portion 158 controls the overall operation of the portable terminal unit 104. The ROM 156 stores a program and so forth that cause the controlling portion 158 to control an operation corresponding to an input signal that is received from the input portion 151. The RAM 155 temporarily acquires a data area and a task area with which the controlling portion 158 executes a program. The ROM 156 stores a program loader. The program loader can load the program. The HDD 160 stores music program data purchased from the information vending unit 105 and the above-described charging information. The terminal ID data is stored in the RAM when the terminal unit 104 is shipped. The user ID data is written to the portable terminal unit 104 when the user purchases the portable terminal unit 104.

Music program data stored in the HDD 110 is transmitted from the information vending unit 105 through the interface 152A. As a pre-process for storing music program data to the HDD 160, an encoder/decoder 162 compresses the music program data. As an encoding algorithm of audio data, ATRAC (trade mark), MPEG (Moving Picture coding Experts Group), PASC (Precision Adaptive Sub-band Coding), TwinVQ (trade mark), RealAudio (trademark), LiquidAudio (trademark), or the like can be used.

When music program data is stored to the HDD 160, as described above, terminal ID data (as unique information of the portable terminal unit 104), user ID data (as user identification data), content ID data (as music program identification data), and charging information are also stored. The charging information contains charging request information and reproduction permission information.

In the above-described embodiment, music program data encoded by the encoder/decoder 162 is stored to the HDD 160. Alternatively, music program data that is not encoded may be stored to the HDD 160.

An analog audio signal that is input from a microphone 163 is supplied to an A/D converter 166 through an amplifier 164. The A/D converter 166 converts the input analog audio signal into a digital signal and supplies the digital audio signal to the encoder/decoder 162. The encoder/decoder 162 compresses the digital audio signal corresponding to one of the above-described various compressing methods. In such a manner, the analog audio signal that is input from the microphone 163 can be compressed by the encoder/decoder 162 and stored to the HDD 160.

When music program data or audio data stored in the HDD 160 is reproduced, it is sent to the encoder/decoder 162. The encoder/decoder 162 performs a decompressing process for the music program data or audio data received from the HDD 160. The decompressed music program data or digital audio signal that is output from the encoder/decoder 162 is supplied to a D/A converter 167. The D/A converter 167 converts the digital data received from the encoder/decoder 162 into an analog audio signal. The analog audio signal is output from a speaker 119 through an amplifier 168. The encoder/decoder 162 performs an inverse process of the encoding process. Thus, the process of the encoder/decoder 162 may be performed as a software process of the controlling portion 158, rather than dedicated hardware.

In this example, the downloading process and the charging process for music program data are separately performed. Thus, the user can smoothly purchase music program data from the information vending unit 105. Since the charging process is performed by the charging processing unit 102 disposed in the house of the user, the user and the portable terminal unit can be easily identified. Thus, the charging process can be smoothly performed. In addition, music program data can be prevented from being illegally used.

In the above-described example, the recording and reproducing apparatus uses a disc as a recording medium. However, the present invention can be applied to an apparatus and a system that use a magnetic tape or semiconductor memory as a record-medium other than a disc.

According to the present invention, although music program data is perfectly recorded on a disc, TOC data corresponding thereto is not perfectly recorded thereon. When the TOC data is imperfect, music program data cannot be reproduced from a disc. When music program data is reproduced from the disc, TOC data is rewritten to perfect TOC data.

When music program data is purchased through a communication line, although the music program data has been recorded on a disc, a signal that prohibits the music program data from being reproduced is recorded on the disc. Unless the music program data is charged, the music program data on the disc cannot be reproduced. To allow the music program data on the disc to be reproduced, it is necessary to perform a charging process through a communication line. After the charging process has been performed, the signal is canceled so that the music program data can be reproduced.

In such a manner, although music program data has been recorded on a disc, imperfect TOC data or a signal has been recorded so that music program data is prohibited from being reproduced. To allow music program data to be reproduced, the TOC data is rewritten or the signal is canceled.

Thus, since the data transmission time is shortened, music program data can be downloaded at high speed. In addition, the charging process can be smoothly performed. Moreover, music program data can be prevented from being illegally used.

INDUSTRIAL UTILIZATION

As described above, the recording and reproducing apparatus, data reproducing method, and data recording and reproducing methods according to the present invention are suitable for a music program distributing system that allows the user to obtain music program data through a communication line.

What is claimed is:

1. A recording and reproducing apparatus, comprising:
a recording and reproducing portion including a recording medium having a storing portion for storing multimedia data programs and including a first management area for storing index data for managing said multimedia data programs, wherein said index data is a pre-stored imperfect index data so that said multimedia data programs are unreproduceable from said storing portion, and a second management area for recording management data for identifying said recording medium, wherein said recording medium is a hybrid disc including a reproduction-only area and a rewritable area, said reproduction-only area having recorded thereon said multimedia data programs and said second management area, and said rewritable area having recorded thereon said pre-stored imperfect index data, and said recording and reproducing portion records and reproduces multimedia data to/from said hybrid disc including reproducing and transmitting said management data; and a server unit having a signal generating portion for generating and transmitting a perfect index data based on said management data identifying said recording medium transmitted by said recording and reproducing portion so that said multimedia data programs are reproduceable by said recording and reproducing portion, wherein when said signal generating portion transmits said perfect index data to said recording and reproducing portion, said recording and reproducing portion replaces said pre-stored imperfect index data recorded on said rewritable area of said hybrid disc with said perfect index data, thereby enabling the reproduction of said stored multimedia data programs stored in said reproduction-only area of said hybrid disc.

2. The recording and reproducing apparatus set forth in claim 1, further comprising:

a charge processing portion for performing a charging process before said signal generating portion generates said perfect index data, wherein when said recording and reproducing portion reproduces said multimedia data programs stored in said storing portion, said recording and reproducing portion supplies said perfect index data to said signal generating portion and said charge processing portion performs said charging process, and when said charge processing portion has completed said charging process, said signal generating portion generates said perfect index data.

3. The recording and reproducing apparatus set forth in claim 1, further comprising:

a charge processing portion, wherein when said recording and reproducing portion reproduces said multimedia data programs stored in said storing portion, said recording and reproducing portion supplies a charging process signal to said charge processing portion so that said charge processing portion performs a charging process, and after said charge processing portion has completed said charging process, said signal generating portion supplies said perfect index data to said recording and reproducing portion.

4. The recording and reproducing apparatus set forth in claim 3, wherein said storing portion stores said charging process signal and said perfect index data along with said multimedia data programs, and said recording and reproducing portion rewrites said pre-stored imperfect index data with said perfect index data received from said signal generating portion.

5. The recording and reproducing apparatus set forth in claim 3, wherein said charge processing portion is connected to said recording and reproducing portion and to said server unit through a communication network.

6. The recording and reproducing apparatus set forth in claim 5, wherein identification data is stored in said terminal unit, and when said recording and reproducing portion reproduces said multimedia data programs stored in said storing portion, said terminal unit supplies said identification data to said charge processing portion, and when said charge processing portion has determined that said terminal unit is valid based upon said identification data received from said terminal unit, said charge processing portion starts said charging process.

7. The recording and reproducing apparatus set forth in claim 6, wherein when said charge processing portion has determined that said terminal unit is valid based upon said identification data received from said terminal unit, said charge processing portion is connected to said server unit through said communication network so that said charge processing portion performs said charging process and replaces said pre-stored imperfect index data with said perfect index data received from said signal generating portion.

8. A recording and reproducing apparatus, comprising:

a recording medium having a storing portion for storing multimedia data programs and including a first management area for storing index data for managing said multimedia data programs, wherein said index data is a pre-stored imperfect index data so that said multimedia data programs are unreproduceable from said storing portion, and second management area for recording management data for identifying said recording medium, wherein said recording medium is a hybrid disc including a reproduction-only area and a rewritable area said reproduction-only area having recorded thereon said multimedia data programs and said second management area, and said rewritable area having recorded thereon said pre-stored imperfect index data;

a recording and reproducing portion for recording and reproducing data from said hybrid disc, wherein said recording and reproducing portion reproducing and transmitting said management data; and a signal generating portion for generating and transmitting a perfect index data based on said management data identifying said recording medium transmitted by said recording and reproducing portion so that said multimedia data programs are reproduceable by said recording and reproducing portion, wherein when said signal generating portion transmits said perfect index data to said recording and reproducing portion, said recording and reproducing portion replaces said pre-stored imperfect index data recorded on said rewritable area of said hybrid disc with said perfect index data, thereby enabling the reproduction of said stored multimedia data programs stored in said reproduction-only area of said hybrid disc.

9. The recording and reproducing apparatus set forth in claim 8, further comprising:

a charge processing portion for performing a charging process before said signal generating portion generates said perfect index data, wherein when said recording and reproducing portion reproduces said multimedia data programs stored in said storing portion, said recording and reproducing portion supplies said perfect index data to said signal generating portion and said charge processing portion performs said charging process, and when said charge processing portion has completed said charging process, said signal generating portion generates said perfect index data.

10. The recording and reproducing apparatus set forth in claim 8, further comprising:

a terminal unit connected to said recording and reproducing portion; and a server unit containing said signal generating portion, said server unit being connected to said terminal unit through a communication network.

11. The recording and reproducing apparatus as set forth in claim 8, further comprising:

a terminal unit containing said signal generating portion, said terminal unit being connected to said recording and reproducing portion; and a server unit connected to said terminal unit through a communication network.

12. The recording and reproducing apparatus set forth in claim 8, further comprising:

a charge processing portion, wherein when said recording and reproducing portion reproduces said multimedia data programs stored in said storing portion, said recording and reproducing portion supplies a charging process signal to said charge processing portion so that said charge processing portion performs a charging process, and after said charge processing portion has completed said charging process, said signal generating portion supplies said perfect index data to said recording and reproducing portion.

13. The recording and reproducing apparatus set forth in claim 12, wherein said storing portion stores said charging process signal and said perfect index data along with said multimedia data programs, and said recording and reproducing portion rewrites said pre-stored imperfect index data with said perfect index data received from said signal generating portion.

* * * * *